(12) United States Patent  
Nakamura

(10) Patent No.: US 6,744,440 B1  
(45) Date of Patent: Jun. 1, 2004

(54) IMAGE PROCESSING APPARATUS, RECORDING MEDIUM, AND PROGRAM

(75) Inventor: Tadashi Nakamura, Tokyo (JP)

(73) Assignee: Sony Computer Entertainment Inc. (JP)

( * ) Notice: Subject to any disclaimer, the term of this patent is extended or adjusted under 35 U.S.C. 154(b) by 236 days.

(21) Appl. No.: 09/657,092

(22) Filed: Sep. 7, 2000

(30) Foreign Application Priority Data

Sep. 10, 1999 (JP) .............................. 11-258047  
Aug. 3, 2000 (JP) ........................... 2000-236125

(51) Int. Cl.[7] ................................. G09G 5/00

(52) U.S. Cl. .................. 345/582; 345/584; 345/586; 345/629; 345/522

(58) Field of Search ..................... 345/522, 584, 345/582, 629

(56) References Cited

U.S. PATENT DOCUMENTS

| | | | | |
|---|---|---|---|---|
| 4,644,585 A | * | 2/1987 | Crimmins et al. | 382/283 |
| 5,245,432 A | | 9/1993 | Jaffray et al. | 358/160 |
| 5,638,499 A | | 6/1997 | O'Connor et al. | 395/131 |
| 5,745,667 A | * | 4/1998 | Kawase et al. | 345/587 |
| 5,748,198 A | | 5/1998 | Takeda et al. | 345/441 |
| 5,870,102 A | * | 2/1999 | Tarolli et al. | 345/586 |
| 6,278,463 B1 | * | 8/2001 | Chapman et al. | 345/700 |

FOREIGN PATENT DOCUMENTS

| | | |
|---|---|---|
| EP | 0 817 129 A2 | 1/1998 |
| JP | 0738228 A | 12/1995 |
| WO | WO 99/26201 | 5/1999 |

OTHER PUBLICATIONS

McReynolds, "Advanced Graphics Programming Techniques Using OpenGL", Jul. 18–24 1998, Abstract (Notes for SIGGRAPH 1998 Conference, Orlando, Florida).*

Miller, G. et al: "On–the–Fly Texture Computation for Real–Time Surface Shading", IEEE Computer Graphics and Applications, vol. 18, No. 2, Mar. 1998, pp. 44–58.

Beeson, Curtis, "X3D Multitexture," Proposal May 14, 1999, Web3D Consortium, X3D Specification, Editor: Rob Glidden, http://www.web3d.org/TaskGroups/x3d/quadramix/multitexture.htm.

McReynolds, Tom et al., "Advanced Graphics Programming Techniques Using OpenGL," Course Notes used at the SIGGRAPH 1998 Conference, Orlando, Florida, Jul. 18–24, 1998, Association for Computing Machinery (ACM), http://www.siggraph.org/s98/s98main.html, http://www.sgi.com/software/opengl/advanced98/notes/notes.html.

(List continued on next page.)

*Primary Examiner*—Matthew C. Bella  
*Assistant Examiner*—Antonio Caschera  
(74) *Attorney, Agent, or Firm*—Lerner, David, Littenberg, Krumholz & Mentlik, LLP

(57) ABSTRACT

The texture of a nonsmooth mirror or metal surface can be generated by a simple, highly effective bump mapping process. An original image as a color image is combined with a gray pattern image having differently shaped regions in different positions by a first combining unit thereby to generate a first combined texture image. The original image is enlarged based on attributes of a polygon, which include the direction of a normal vector, etc., thereby to generate an enlarged original texture image. The enlarged original texture image If and a reversed gray pattern image are combined with each other by a second combining unit to generate a second combined texture image. The first combined texture image and the second combined texture image are combined with other thereby to generate a third combined texture image. The third combined texture image is capable of expressing the texture of a nonsmooth mirror or metal surface.

48 Claims, 30 Drawing Sheets

OTHER PUBLICATIONS

Valacar, "Blend Tutorial for Photoshop," Valacar's Art Page, http://valacar.waveforms.com/art/tuts/blend/blendtutorial.html.

"Beginner's Texture Design for Photoshop and Illustrator" MdN Magazine: Book of Materials, MdN Corp., Aug. 1, 1999, pp. 63, 74, 81, 85 and 96 (original and in translation).

* cited by examiner

FIG. 5
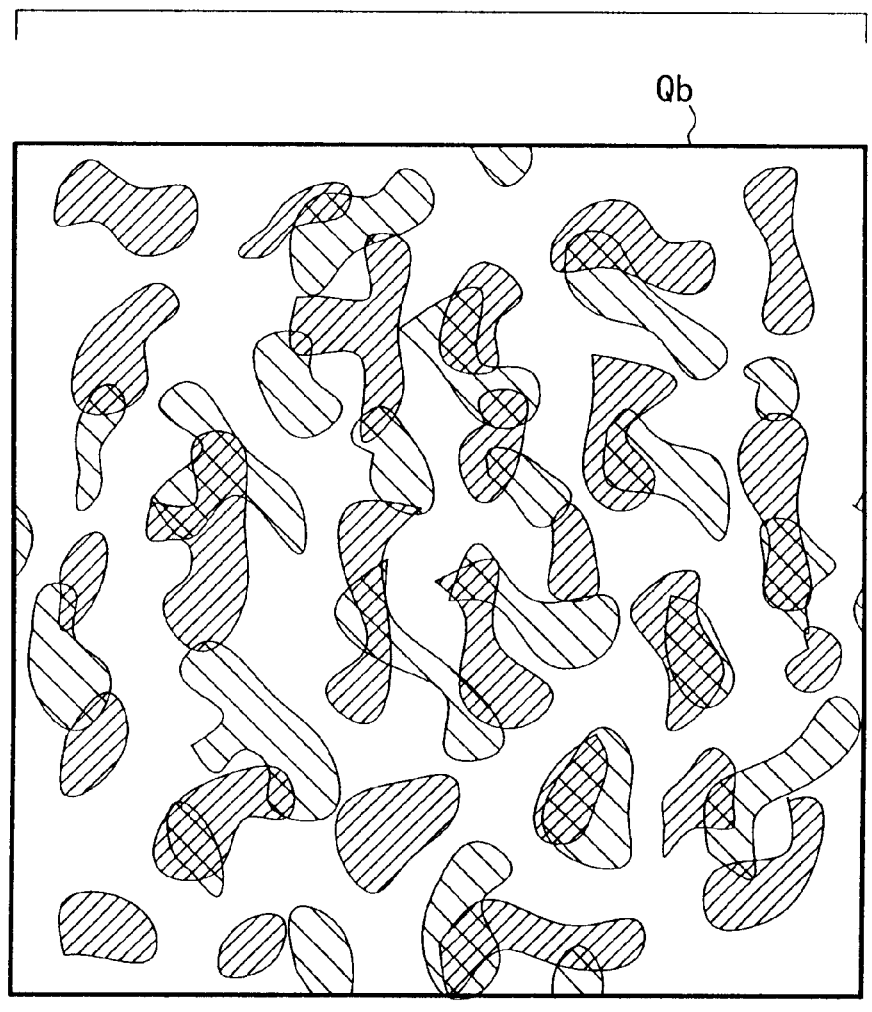
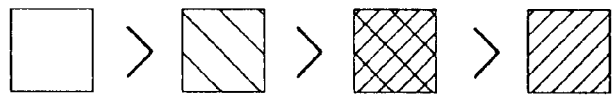
LUMINANCE ORDER

FIG. 8
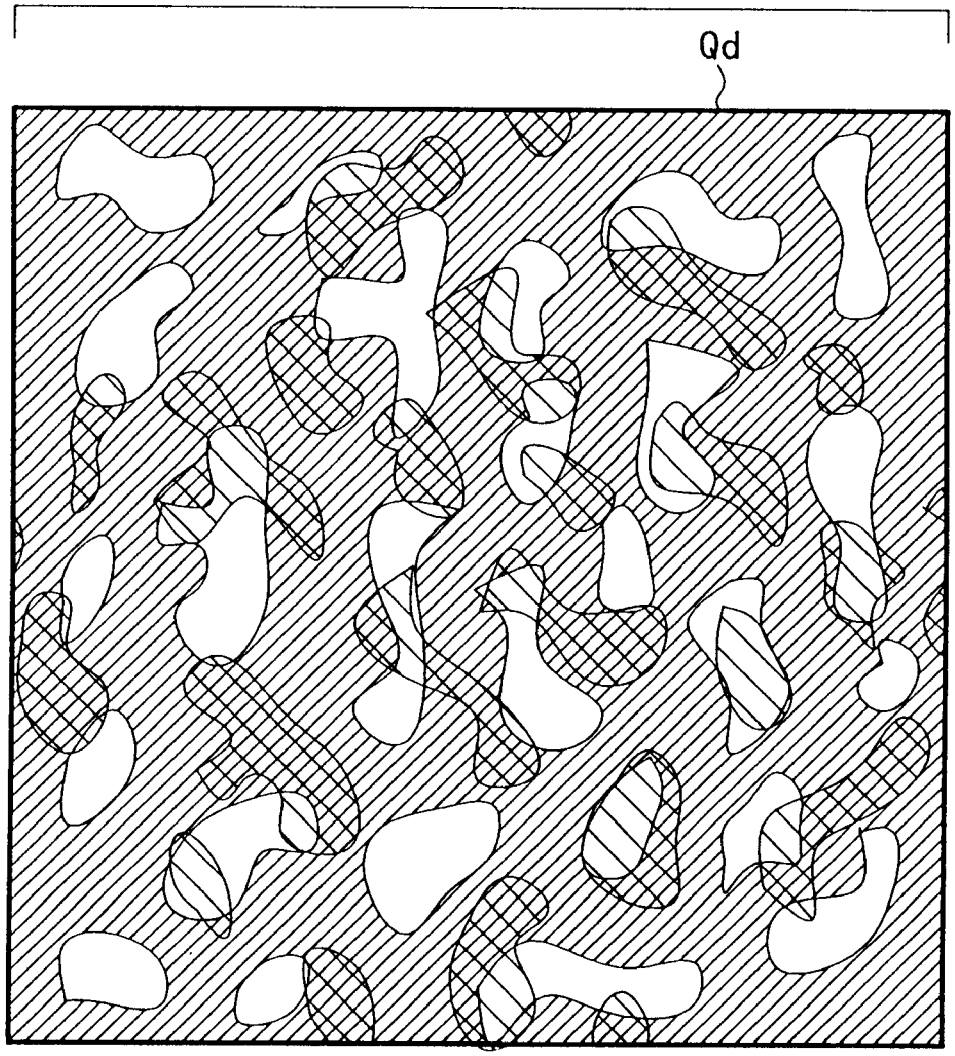
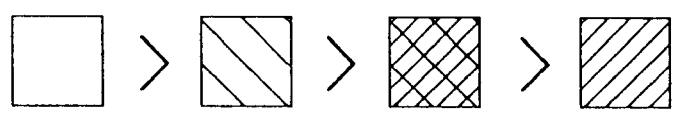
LUMINANCE ORDER

FIG. 19

|  | | | | Ifa<br>(pla) | Ifd<br>(pld) | |
|---|---|---|---|---|---|---|
|  |  | 11 | 12 | 13 | 14 |
|  |  | 21 | 22 | 23 | 24 |
| Ie | 11 | 12 | 31<br>(13) | 32<br>(14) | 33 | 34 |
| Ia | 21 | 22 | 41<br>(23) | 42<br>(24) | 43 | 44 |
| Id | 31 | 32 | 33 | 34 |
|  | 41 | 42 | 43 | 44 |

ISrcAlpha[y][x]

IDstAlpha[0][y][x]

IDstAlpha[1][y][x]

IDstAlpha[2][y][x]

IDstAlpha[3][y][x]

IDstAlpha[4][y][x]

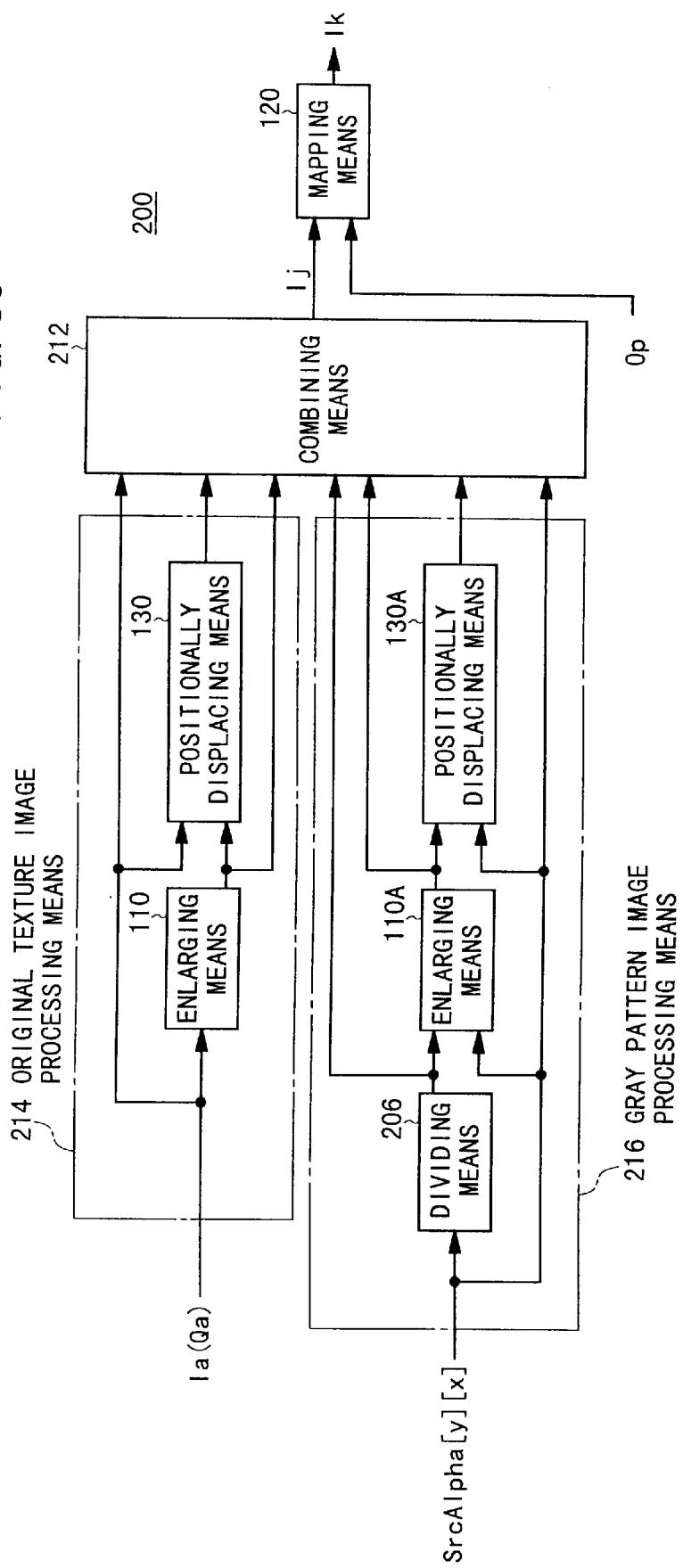

IMAGE PROCESSING APPARATUS, RECORDING MEDIUM, AND PROGRAM

BACKGROUND OF THE INVENTION

1. Field of the Invention

The present invention relates to an image processing apparatus for use as a CG (Computer Graphics) processing apparatus for mapping a texture image onto a shaped surface such as a polygon, a quadratic surface, or the like to render a shape having a pattern or a texture, especially a surface irregularity texture, a recording medium storing a program for such an image processing process, and such a program.

2. Description of the Related Art

One rendering technique known as bump mapping produces the appearance of a nonsmooth surface by angularly perturbing the vectors of normals that represent the gradients of small facets that jointly make up a smooth surface.

Bump mapping is advantageous because it can produce a sufficiently irregular texture without performing calculations to input complex shapes.

However, the conventional bump mapping process is complicated in that it needs to be implemented by perturbing the normal vector of each small facet.

Another problem of the conventional bump mapping process is that it fails to express the texture of a mirror or metal surface which has surface irregularities.

SUMMARY OF THE INVENTION

It is therefore an object of the present invention to provide an image processing apparatus, a recording medium, and a program which make it possible to express a nonsmooth surface with a simple arrangement or processing sequence.

Another object of the present invention is to provide an image processing apparatus, a recording medium, and a program which make it possible to a special image easily with a simple arrangement.

Still another object of the present invention is to provide an image processing apparatus, a recording medium, and a program which are capable of expressing the texture of a mirror or metal surface which has surface irregularities.

According to an aspect of the present invention, there is provided an apparatus for processing an image, comprising original texture image storing means for storing an original texture image, gray pattern image storing means for storing a gray pattern image having differently shaped regions in different positions, and texture image generating means for combining the original texture image and the gray pattern image with each other thereby to generate a texture image.

The texture image generating means combines the original texture image and the gray pattern image with each other thereby to generate a texture image. The texture image thus generated represents the original texture image as modulated by the shades of the gray pattern image. As a result, a special image can easily be generated with a simple arrangement or processing sequence.

The original texture image may alternatively be combined with a reversed gray pattern image having pixel shades which are a reversal of pixel shades of the gray pattern image.

The original texture image may further alternatively be combined with both a gray pattern image having differently shaped regions in different positions and a reversed gray pattern image having pixel shades which are a reversal of pixel shades of the gray pattern image. The texture image generating means combines the original texture image with either one of the gray pattern image and the reversed gray pattern image to generate a first combined image, thereafter combines an image produced by enlarging the original texture image with the other one of the gray pattern image and the reversed gray pattern image to generate a second combined image, and combines the first combined image and the second combined image with each other to generate the texture image.

The texture image thus generated is capable of expressing the texture of a nonsmooth mirror or metal surface.

The texture image generating means may enlarge the original texture image according to a value calculated based on at least one of the direction of a normal vector, the direction of a line-of-sight vector, and the direction of an imaginary light source vector, of a shaped surface onto which the texture image is mapped. The shaped surface thus represents a realistic nonsmooth surface. The shaped surface may be a polygon, a quadratic surface, or the like.

If the original texture image is combined with both a gray pattern image having differently shaped regions in different positions and a reversed gray pattern image having pixel shades which are a reversal of pixel shades of the gray pattern image, then the texture image generating means combines the original texture image with either one of the gray pattern image and the reversed gray pattern image to generate a first combined image, thereafter combines an image produced by positionally displacing the original texture image with the other one of the gray pattern image which is positionally displaced and the reversed gray pattern image which is positionally displaced to generate a second combined image, and combines the first combined image and the second combined image with each other to generate the texture image.

The texture image thus generated is capable of expressing the texture of a nonsmooth surface which reflects light by way of diffuse reflection.

The texture image generating means may positionally displace the original texture image according to a value calculated based on at least one of the direction of a normal vector, the direction of a line-of-sight vector, and the direction of an imaginary light source vector, of a shaped surface onto which the texture image is mapped. The shaped surface thus represents a realistic nonsmooth surface. The shaped surface may be a polygon, a quadratic surface, or the like.

According another aspect of the present invention, there is provided a recording medium storing a program, the program comprising the steps of reading an original texture image and a gray pattern image having differently shaped regions in different positions, and combining the original texture image and the gray pattern image to generate a texture image.

The original texture image and the gray pattern image having differently shaped regions in different positions are combined with each other to generate a texture image. The texture image thus generated represents the original texture image as modulated by the shades of the gray pattern image. As a result, a special image can easily be generated with a simple arrangement.

In the program stored in the recording medium, the original texture image may alternatively be combined with a reversed gray pattern image having pixel shades which are a reversal of pixel shades of the gray pattern image.

In the program stored in the recording medium, the original texture image may further alternatively be combined with both a gray pattern image having differently shaped regions in different positions and a reversed gray pattern image having pixel shades which are a reversal of pixel shades of the gray pattern image. The original texture image is combined with either one of the gray pattern image and the reversed gray pattern image to generate a first combined image, thereafter an image produced by enlarging the original texture image is combined with the other one of the gray pattern image and the reversed gray pattern image to generate a second combined image, and the first combined image and the second combined image are combined with each other to generate the texture image.

The texture image thus generated is capable of expressing the texture of a nonsmooth mirror or metal surface.

The original texture image may be enlarged according to a value calculated based on at least one of the direction of a normal vector, the direction of a line-of-sight vector, and the direction of an imaginary light source vector, of a shaped surface onto which the texture image is mapped. The shaped surface thus represents a realistic nonsmooth surface. The shaped surface may be a polygon, a quadratic surface, or the like.

If the original texture image is combined with both a gray pattern image having differently shaped regions in different positions and a reversed gray pattern image having pixel shades which are a reversal of pixel shades of the gray pattern image, then the original texture image is combined with either one of the gray pattern image and the reversed gray pattern image to generate a first combined image, thereafter an image produced by positionally displacing the original texture image is combined with the other one of the gray pattern image which is positionally displaced and the reversed gray pattern image which is positionally displaced to generate a second combined image, and the first combined image and the second combined image are combined with each other to generate the texture image.

The texture image thus generated is capable of expressing the texture of a nonsmooth surface which reflects light by way of diffuse reflection.

The original texture image may be positionally displaced according to a value calculated based on at least one of the direction of a normal vector, the direction of a line-of-sight vector, and the direction of an imaginary light source vector, of a shaped surface onto which the texture image is mapped. The shaped surface thus represents a realistic nonsmooth surface. The shaped surface may be a polygon, a quadratic surface, or the like.

According to still another aspect of the present invention, there is provided a program comprising the steps of reading an original texture image and a reversed gray pattern image having pixel shades which are a reversal of pixel shades of a gray pattern image having differently shaped regions in different positions, and combining the original texture image and the reversed gray pattern image to generate a texture image.

In the above program, the texture image which is generated by combining the original texture image and the reversed gray pattern image represents the original texture image as modulated by the shades of the gray pattern image. As a result, a special image can easily be generated with a simple arrangement.

According to yet another aspect of the present invention, there is provided an apparatus for processing an image, comprising original texture image storing means for storing an original texture image, original texture image processing means for processing the original texture image to generate a processed original texture image, gray pattern image storing means for storing a gray pattern image having differently shaped regions in different positions, gray pattern image processing means for processing the gray pattern image to generate a processed gray pattern image, and texture image generating means for combining the original texture image or the processed texture image with the gray pattern image and/or the processed gray pattern image to generate a texture image.

In the above apparatus, the texture image generated by the texture image generating means represents an image whose shades are variously modulated which is produced by combining the original texture image or the processed texture image with the gray pattern image and/or the processed gray pattern image. Consequently, a more special image can easily be generated with a relatively simple arrangement.

The original texture image processing means may enlarge and/or positionally displace the original texture image to generate the processed original texture image, and the gray pattern image processing means may perform at least one of processes of converting the shades of the gray pattern image according to a shade converting algorithm, enlarging the gray pattern image, and positionally displacing the gray pattern image to generate the processed gray pattern image. The original texture image may be enlarged at an enlargement ratio including ×1.

According to yet still another aspect of the present invention, there is provided a recording medium storing a program, the program comprising the steps of reading an original texture image and a gray pattern image having differently shaped regions in different positions, processing the original texture image to generate a processed original texture image, processing the gray pattern image to generate a processed gray pattern image, and combining the original texture image or the processed texture image with the gray pattern image and/or the processed gray pattern image to generate a texture image.

In the program stored in the above recording medium, the texture image thus generated represents an image whose shades are variously modulated which is produced by combining the original texture image or the processed texture image with the gray pattern image and/or the processed gray pattern image. Consequently, a more special image can easily be generated with a relatively simple arrangement.

The step of processing the original texture image may comprise the step of enlarging and/or positionally displacing the original texture image to generate the processed original texture image, and the step of processing the gray pattern image may comprise the step of performing at least one of processes of converting the shades of the gray pattern image according to a shade converting algorithm, enlarging the gray pattern image, and positionally displacing the gray pattern image to generate the processed gray pattern image. The original texture image may be enlarged at an enlargement ratio including ×1.

According to a further aspect of the present invention, there is provided a program comprising the steps of reading an original texture image and a gray pattern image having differently shaped regions in different positions, processing the original texture image to generate a processed original texture image, processing the gray pattern image to generate a processed gray pattern image, and combining the original texture image or the processed texture image with the gray pattern image and/or the processed gray pattern image to generate a texture image.

In the above program, the texture image thus generated represents an image whose shades are variously modulated which is produced by combining the original texture image or the processed texture image with the gray pattern image and/or the processed gray pattern image. Consequently, a more special image can easily be generated with a relatively simple arrangement.

In the above program, the step of processing the original texture image may comprise the step of enlarging and/or positionally displacing the original texture image to generate the processed original texture image, and the step of processing the gray pattern image may comprise the step of performing at least one of processes of converting the shades of the gray pattern image according to a shade converting algorithm, enlarging the gray pattern image, and positionally displacing the gray pattern image to generate the processed gray pattern image. The original texture image may be enlarged at an enlargement ratio including ×1.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a view showing a gray pattern image;

FIG. 8 is a view showing a reversed gray pattern image;

FIG. 19 is a diagram illustrative of a specific positional displacement;

FIG. 30 is a block diagram of an image processing apparatus according to a fourth embodiment of the present invention.

DESCRIPTION OF THE PREFERRED EMBODIMENTS

Figure 1:
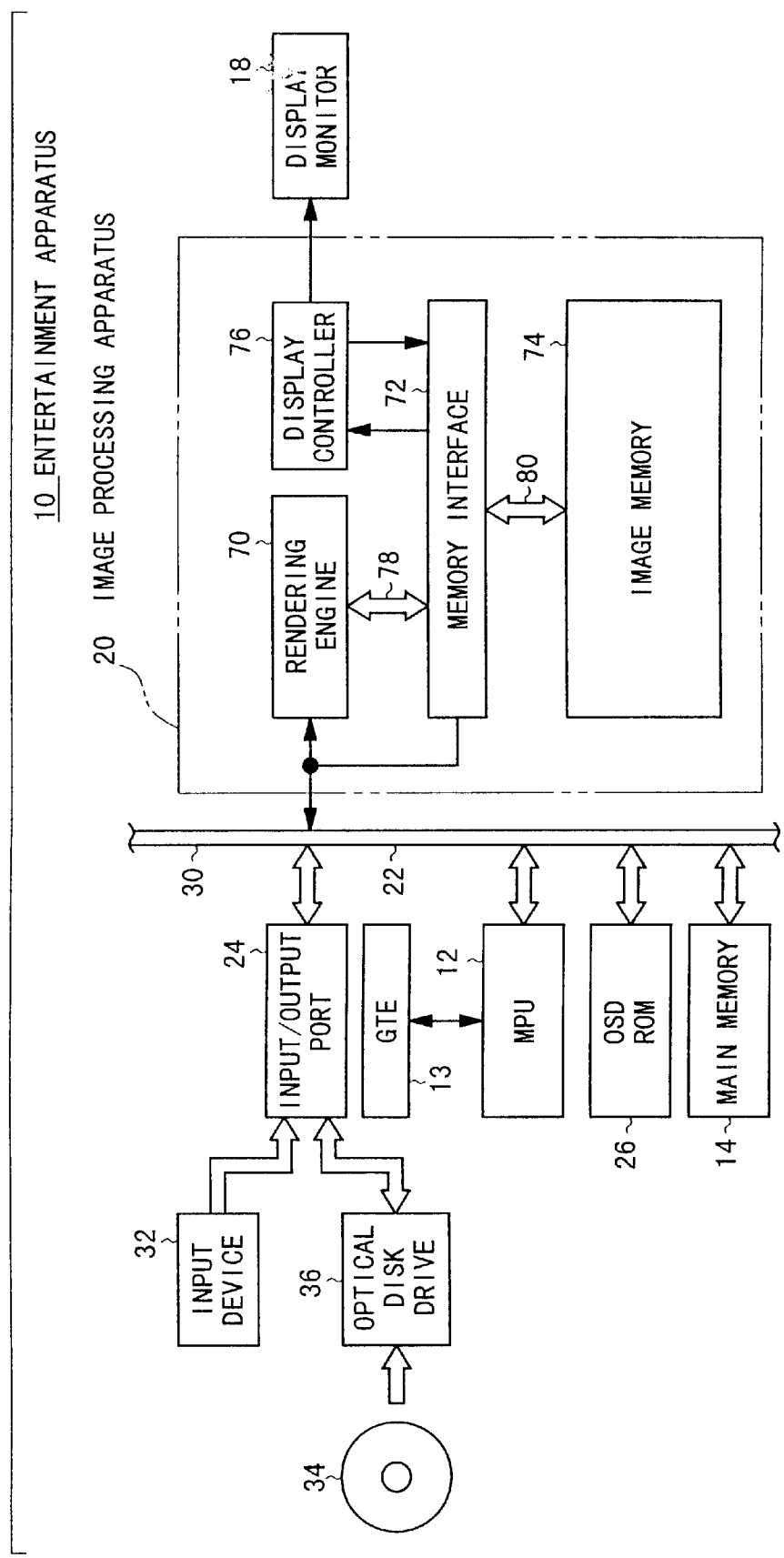
FIG. 1 is a block diagram of a general arrangement of an entertainment apparatus according to the present invention.

FIG. 1 shows an entertainment apparatus 10 for performing three-dimensional CG processing, to which the present invention is applied.

As shown in FIG. 1, the entertainment apparatus 10 comprises an MPU (MircoProcessing Unit) 12 for controlling the entertainment apparatus 10, a main memory 14 for storing various programs to be run and various data, an image processor 20 for generating image data under the control of the MPU 12 and outputting the generated image data to a display monitor 18, e.g., a CRT, an input/output port 24 for sending data to and receiving data from external devices, and a ROM, i.e., OSDROM (On-Screen-Display Read-Only Memory), 26 with an OSD function, which may comprise a flash memory or the like, for controlling the kernel, etc.

The main memory 14, the OSDROM 26, and the input/output port 24 are connected to the MPU 12 via a bus 30. A GTE (Geometry Transfer Engine) 13 for performing coordinate transforms including perspective projection transforms, light source calculations, vector operations, polygon coordinate operations, etc. at high speed is connected directly to the MPU 12.

The GTE 13 has a function to divide a three-dimensional model to be displayed continuously as a moving image on the display monitor 18, into polygons or shaped facets according to calculation commands from the MPU 12.

To the input/output port 24, there are connected an input device 32 for inputting data (key entry data, coordinate data, etc.) to the entertainment apparatus 10, and an optical disk drive 36 for playing back an optical disk 34 such as a CD-ROM, a DVD, or the like in which various programs and data (object-related data, texture data, etc.) are stored. The input device 32 may comprise a manual controller having direction buttons, etc.

The image processor 20 comprises a rendering engine 70, a memory interface 72, an image memory 74, and a display controller 76 such as a programmable CRT controller or the like.

The rendering engine 70 serves to render image data based on rendering commands supplied from the MPU 12 and polygon coordinate data, and stores the rendered image data in the image memory 74 via the memory interface 72.

Specifically, the rendering engine 70 performs a texture mapping process by applying colors and shades, adding optical properties including mirror reflection, diffuse reflection, refraction, transparency, etc., adding surface patterns, and adding surrounding light, i.e., ambient light, to polygons (polygon coordinate data) which are shaped facets divided from a three-dimensional model that are calculated by the GTE 13 and supplied from the MPU 12.

A first bus 78 is connected between the memory interface 72 and the rendering engine 70, and a second bus 80 is connected between the memory interface 72 and the image memory 74. Each of the first and second buses 78, 80 has a 128-bit width, for example, for allowing the rendering engine 70 to render and store image data in the image memory 74 at a high speed.

The rendering engine 70 is capable of rendering image data of 320×240 pixels or image data of 640×480 pixels according to the NTSC or PAL system on a real-time fashion, i.e., more than ten times to several ten times in 1/60 seconds to 1/30 seconds.

The image memory 74 is of a unified memory structure that is able to designate a texture rendering area and a display rendering area as the same area.

The image controller 76 writes texture data read from the optical disk 34 via the optical disk drive 36 or texture data read from the OSDROM 26 via the memory interface 72 into the texture rendering area of the image memory 74, and reads image data rendered in the display rendering area of the image memory 74 via the memory interface 72 and outputs the read image data to the display monitor 18 to display an image on its display screen.

Figure 2:
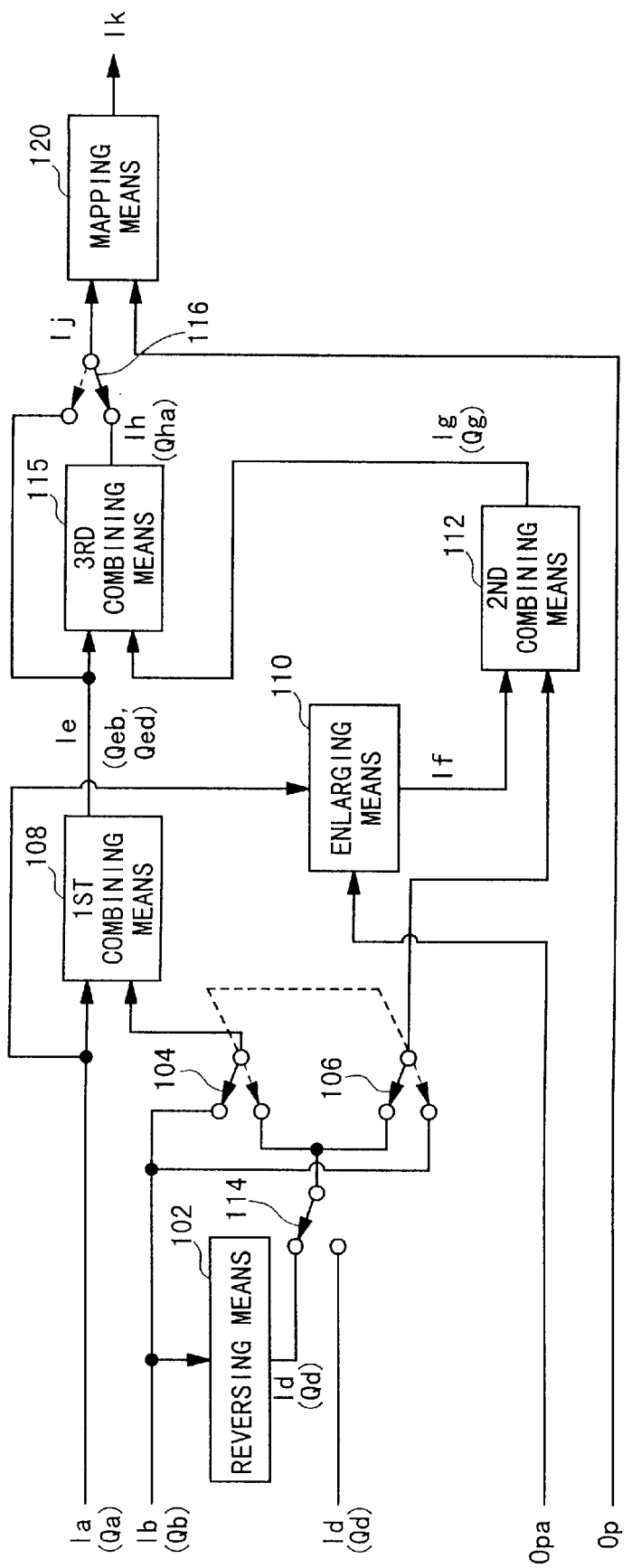
FIG. 2 is a functional block diagram of a texture image generating function or means according to a first embodiment of the present invention.

FIG. 2 shows in function block form an image processing (three-dimensional CG processing) program, i.e., a texture image generating function or a texture image generating means, performed by the rendering engine 70, which carries out a rendering process on a three-dimensional shape (3D model) based on rendering commands from the MPU 12, and the MPU 12 and the GET 13 which control the rendering engine 70.

The image processing program is stored, together with three-dimensional model data and two-dimensional model data, in the OSDROM 26, and read and executed by the MPU 12. However, the image processing program, three-dimensional model data, and two-dimensional model data may be stored in the optical disk 34, read by the optical disk drive 36, loaded into the main memory 14, and executed by the MPU 12.

Prior to describing the arrangement shown in FIG. 2, details of image data of texture images that are used by the image processing program shown in FIG. 2 will first be described for an easier understanding of the present invention.

Figure 3:
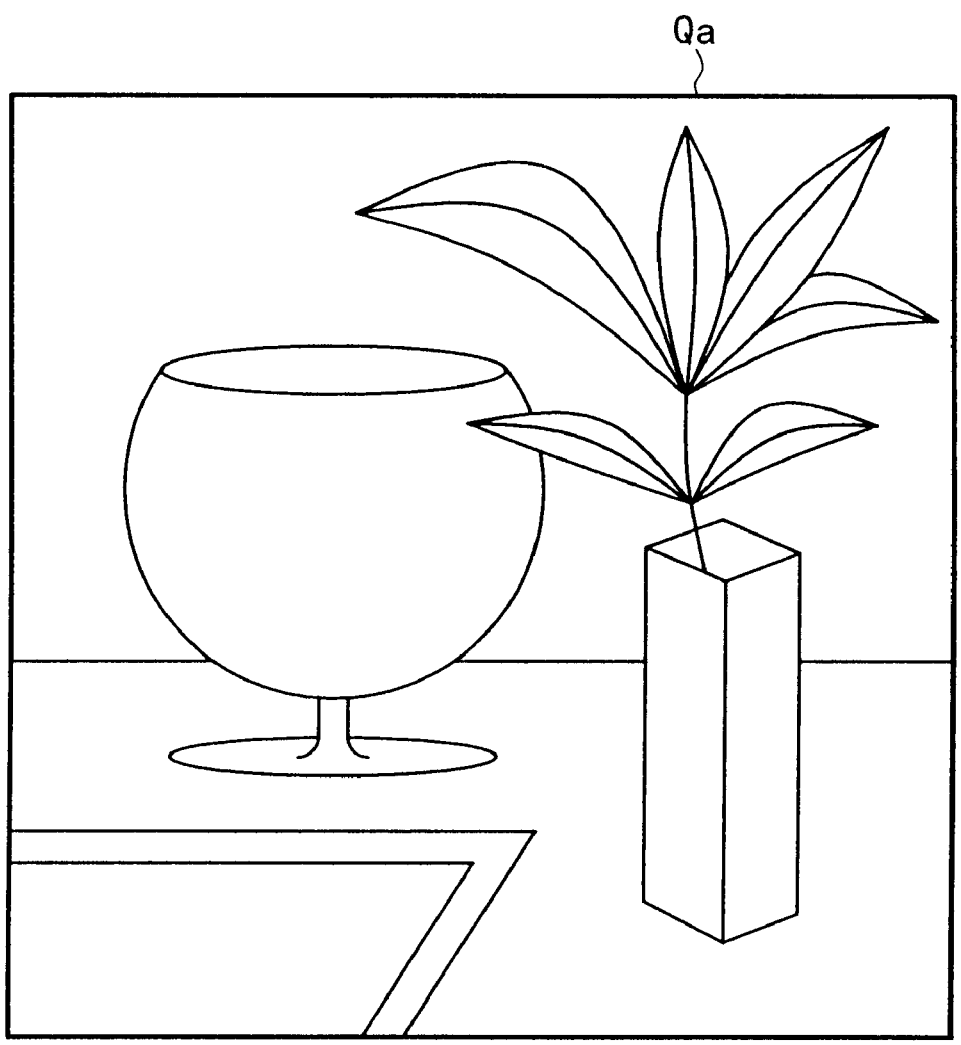
FIG. 3 is a view showing an original texture image.

An original texture image (also referred to as "original image") Ia that is a texture image to be processed comprises image data of a color image picture Qa, which is to be displayed on the display monitor 18, represents a scene or objects as shown in FIG. 3. The original texture image Ia is read from the OSDROM 26 and stored in a given area in the image memory 74.

The image memory 74 also functions as an original texture image storing means, a gray pattern image storing means, a reversed gray pattern image storing means, and a processed gray pattern image storing means.

Figure 4:
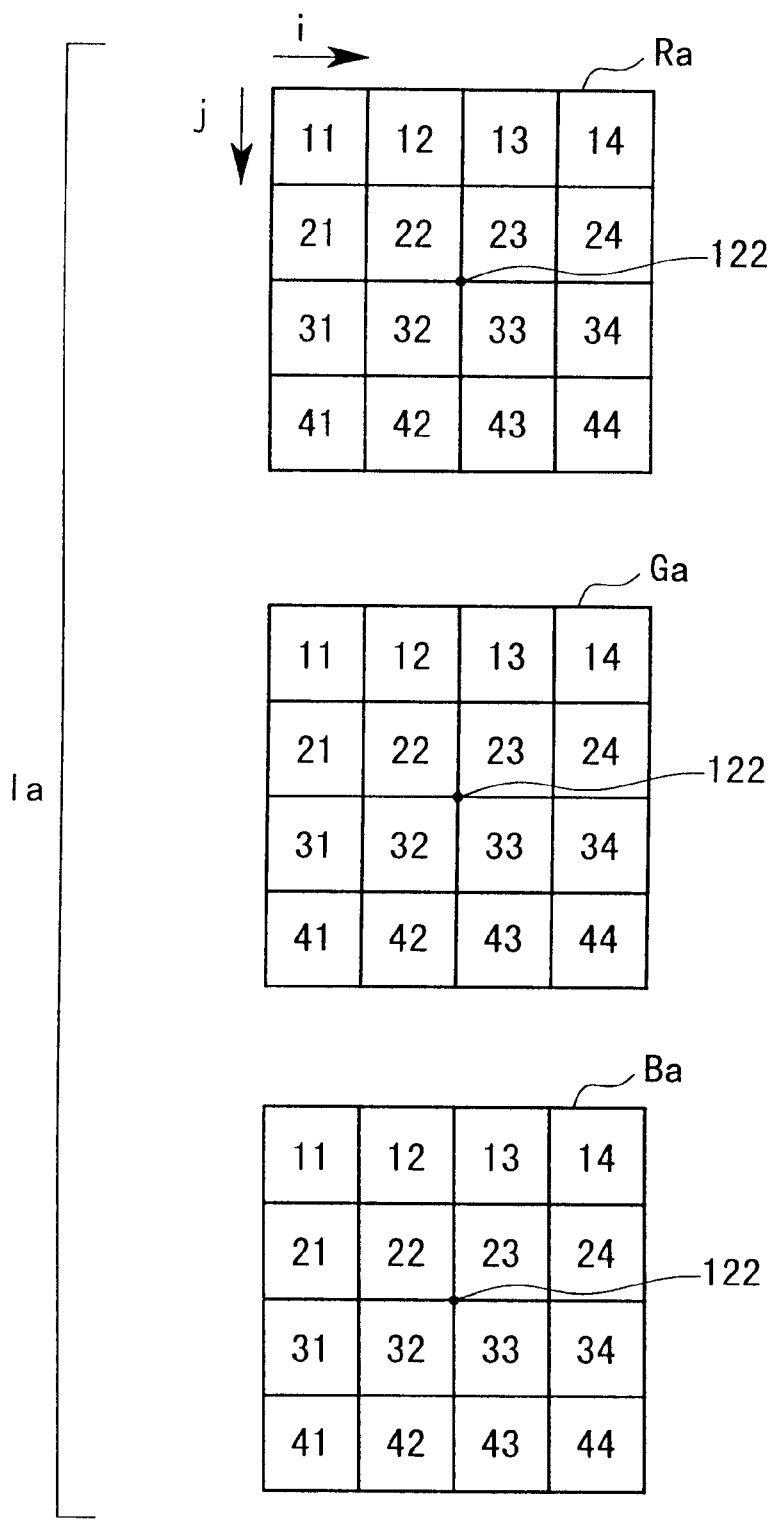
FIG. 4 is a diagram of image data of the original texture image.

FIG. 4 shows the original texture image Ia, actually composed of several hundred pixels×several hundred pixels, stored in the image memory 74, as sets of image data of 4×4 pixels for an easier understanding. The original texture image Ia comprises RGB image data, i.e., image data Ra, image data Ga, and image data Ba (R represents red, G green, and B blue). The value of each pixel ij (i=1–4, j=1–4) of each of the image data Ra, Ga, Ba is represented by 8-bit luminance data in a range of gradations 0–255.

As well known in the art, the color of a pixel ij=(1, 1) is determined by a combination of image data (pixel data) Ra11, image data (pixel data) Ga11, and image data (pixel data) Ba11.

Therefore, the image picture Qa shown in FIG. 3 is determined by a combination of image data Ra, Ga, Ba.

A gray pattern image Ib, which is characteristic of the present invention, comprises image data representing a monochromatic (black-and-white) image picture (also referred to as "gray pattern image picture") Qb having differently shaded regions in different two-dimensional positions, as shown in FIG. 5. The gray pattern image Ib is also read from the OSDROM 26 and stored in a given area in the image memory 74 which is different from the area for storing the original texture image Ia.

In the gray pattern image picture Qb shown in FIG. 5, the luminance is highest in white regions, second highest in coarsely hatched regions, third highest in crosshatched regions, and lowest in closely hatched regions.

Figure 6:
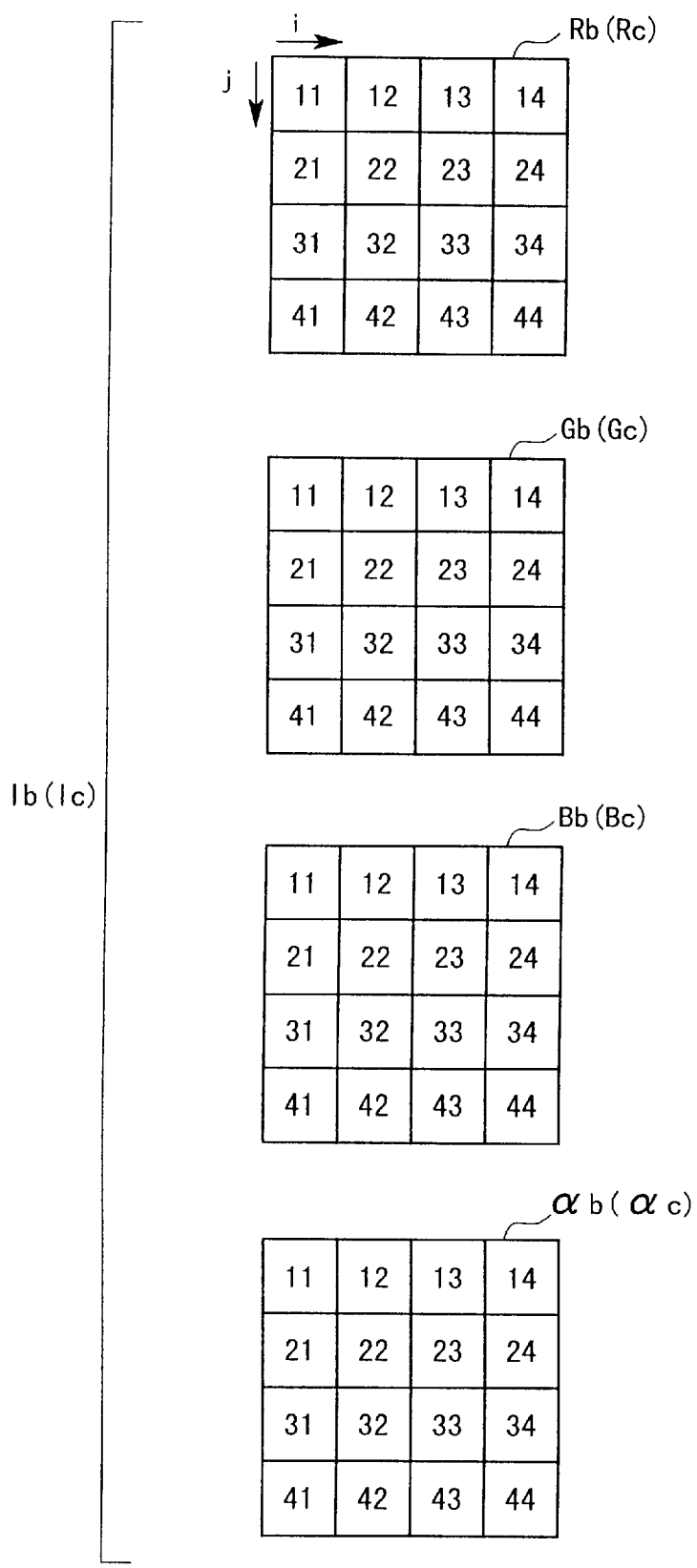
FIG. 6 is a diagram of image data of the gray pattern image.

FIG. 6 shows the gray pattern image Ib, actually composed of several hundred pixels×several hundred pixels, stored in the image memory 74, as sets of image data of 4×4 pixels for an easier understanding. The gray pattern image Ib comprises RGB image data, i.e., image data Rb, image data Gb, and image data Bb, and alpha channel data αb.

Since the gray pattern image Ib represents a gray pattern, i.e., a gray pattern including white and black regions, pixels ij of the image data Rb, the image data Gb, and the image data Bb in the same row i and the same column j have the same luminance value. For example, image data Rb11, Gb11, Bb11 have the same luminance value, and image data Rb22, Gb22, Bb22 have the same luminance value.

However, the image data Rb11 and the image data Rb22 have different luminance values.

In the gray pattern image Ib shown in FIG. 6, all the pixels ij of each of the image data Rb, the image data Gb, and the image data Bb have different luminance values. For example, the luminance values of these pixels ij are arranged such that there is a large difference between the luminance values of adjacent pixels I, j. Since the gray pattern Ib is composed of different gray shades of several hundred pixels×several hundred pixels, as shown in FIG. 5, it looks like a bump map pattern produced by black ink that has flowed over a piece of paper. As described above, the gray pattern image picture Qb corresponding to the gray pattern image Ib is displayed as a monochromatic (black-and-white) image picture.

In FIG. 6, the alpha channel data αb of the gray pattern image Ib represents a combining ratio for combining the gray pattern image Ib with another image. Each pixel ij of the alpha channel data αb has a value ranging from 1 to 255, i.e., a combining ratio ranging from 0 to 1. If a pixel αbij of the alpha channel data αb is allocated a value of αbij=128, then it is normalized by an 8-bit resolution 256, and it is combined with another image at a ratio α of 128/256=0.5. Such a combining process is referred to as an alpha blending process. Usually, a pixel is allocated the ratio α of 0.5.

If the gray pattern image Ib is combined with the original texture image Ia according to the alpha blending process, producing a combined image Ie, then each pixel Ieij of the combined image Ie (first combined texture image, as described later on) has a luminance value, for each R, G, B image data, determined according to the equation (1) shown below. In FIG. 2, the combined image Ie is obtained as an output from a first combining means 108.

$$Ieij=Ibij \times \alpha bij + Iaij \times (1-\alpha bij) \quad (1)$$

Figure 7:
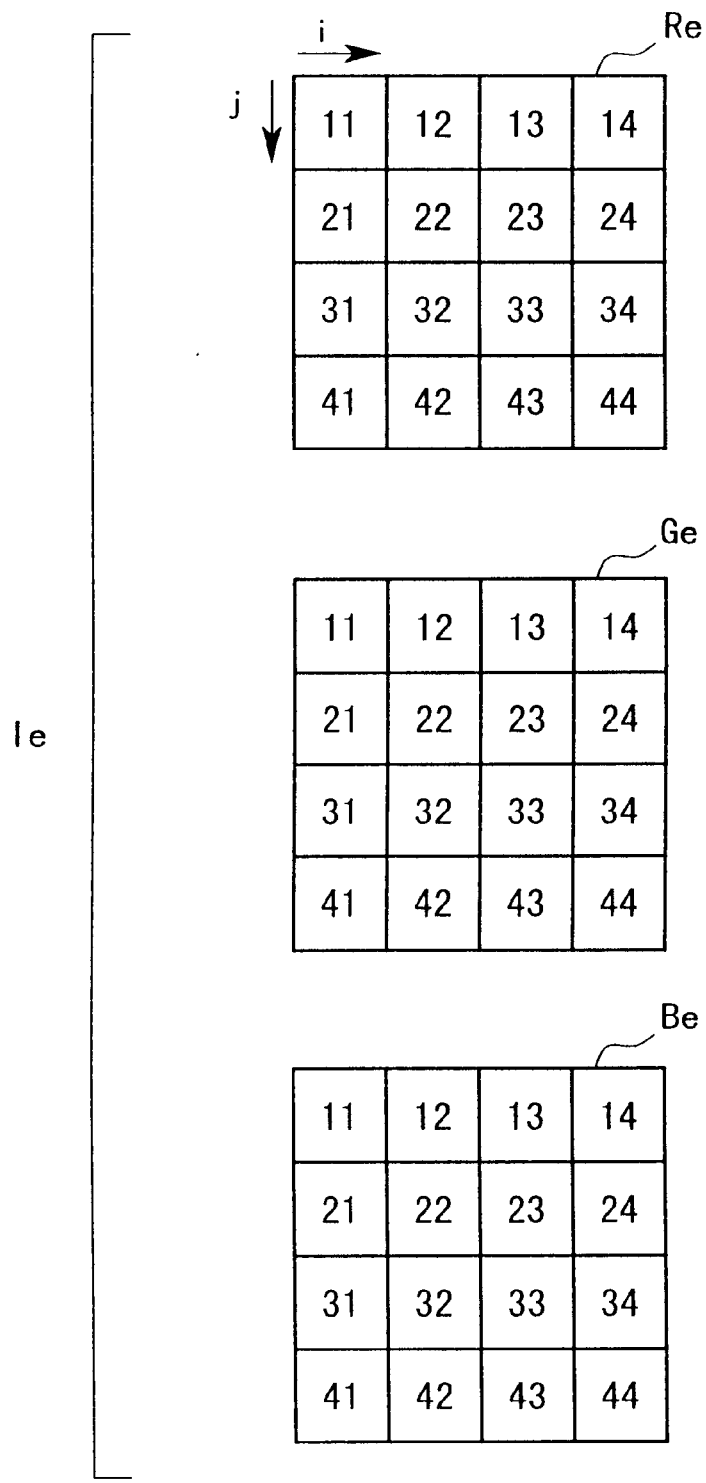
FIG. 7 is a diagram of image data of a combined image produced by a alpha blending process.

FIG. 7 shows the combined image Ie, composed of RGB image data, i.e., image data Re, image data Ge, and image data Be, stored in the image memory 74, as sets of image data of 4×4 pixels.

Of the image data Re, Ge, Be of the combined image Ie, image data (pixel values) Re14, Ge14, Be14 of a pixel ij=(1, 4) are given according to the equation (1) as follows:

Re14=Rb14×αb14+Ra14(1−αb14)

Ge14=Gb14×αb14+Ga14(1−αb14)

Be14=Bb14×αb14+Ba14(1−αb14)

The texture image generating function or means according to the first embodiment shown in FIG. 2 will be described below.

As shown in FIG. 2, the texture image generating function or means comprises a reversing means 102 for reversing the shades of pixels of the gray pattern image Ib having differently shaded regions in different two-dimensional positions thereby to generate a reversed gray pattern image Id as image data, a first combining means 108 for combining the gray pattern image Ib or the reversed gray pattern image Id which is selected by a selecting means 104 with the original texture image Ia according to the alpha blending process thereby to produce a first combined texture image Ie, an enlarging means 110 for enlarging the original texture image Ia into an enlarged original texture image If, and a second combining means 112 for combining the enlarged original texture image If with the gray pattern image Ib or the reversed gray pattern image Id which has not been used by the first combining means 108 according to the alpha blending process thereby to produce a second combined texture image Ig.

The reversed gray pattern image Id supplied to the selecting means 104 may be either the reversed gray pattern image Id generated by the reversing means 102 or a reversed gray pattern image Id stored in the OSDROM 26, which is selected by a selecting means 114. In FIG. 2, the reversed gray pattern image Id generated by the reversing means 102 is selected by the selecting means 114.

The reversing means 102 has an algorithm for reversing different shades. The reversing means 102 serves as a processed gray pattern image generating function or means for converting the shades of a gray pattern image according to a shade converting algorithm to generate a processed gray pattern image.

The reversed gray pattern image Id is related to the gray pattern image Ib as a negative is related to a positive. Therefore, the reversed gray pattern image Id also looks like a bump map pattern of a monochromatic image. FIG. 8 shows a reversed gray pattern image picture Qd which is a reversal of the gray pattern image picture Qb shown in FIG. 5.

In the reversed gray pattern image picture Qd shown in FIG. 8, the luminance is lowest in closely hatched regions which correspond to the white regions shown in FIG. 5, second lowest in crosshatched regions which correspond to the coarsely hatched regions shown in FIG. 5, third lowest in coarsely hatched regions which correspond to the crosshatched regions shown in FIG. 5, and highest in white region which correspond to the closely hatched regions shown in FIG. 5.

The enlarging means 110 shown in FIG. 2 enlarges the original texture image Ia according to a value calculated based on some desired attributes Opa, which include the direction of a normal vector, the direction of a line-of-sight vector, and the direction of an imaginary light source vector, of a shaped surface Op such as a polygon, a quadratic surface, or the like of an object onto which a texture image Ij, described later on, is mapped by a mapping means 120. The attributes Opa serve as enlarging parameters. The shaped surface Op is generated by the GTE 13.

The enlarging means 110 has an algorithm for enlarging an image according to an attribute Opa of a shaped surface Op. Therefore, the enlarging means 110 serves as a processed gray pattern image generating function or means for enlarging a gray pattern image according to an image enlarging algorithm to generate a processed gray pattern image.

The texture image generating function or means shown in FIG. 2 also comprises a third combining means 115 for combining the first combined texture image Ie generated by the first combining means 108 and the second combined texture image Ig generated by the second combining means 112 to generate a third combined texture image Ih, and a mapping means 120 for mapping the first combined texture image Ie or the third combined texture image Ih which is selected by a selecting means 116, onto a shaped surface Op as a texture image Ij (Ij is Ie or Ih) to generate a mapped image Ik.

In FIG. 2, the selecting means 104 is linked complementarily with another selecting means 106 such that when the gray pattern image Ib is supplied to the first combining means 108 via the selecting means 104, the reversed gray pattern image Id is supplied to the second combining means 112 via the other selecting means 106, and when the reversed gray pattern image Id is supplied to the first combining means 108 via the selecting means 104, the gray pattern image Ib is supplied to the second combining means 112 via the other selecting means 106.

A first specific example of an operation sequence of the texture image generating function according to the first embodiment of the present invention, based on the image processing program stored in the OSDROM 26, will be described below with reference to FIG. 9.

In the first specific example, the selecting means 104, 106, which operate in a manner similar to ganged switches, are operated as indicated by the solid-line arrows to supply the gray pattern image Ib to the first combining means 108 and the reversed gray pattern image Id to the second combining means 112, and the selecting means 116 is operated as indicated by the dotted-line arrow to supply the first combined texture image Ie as the texture image Ij to the mapping means 120.

Figure 9:
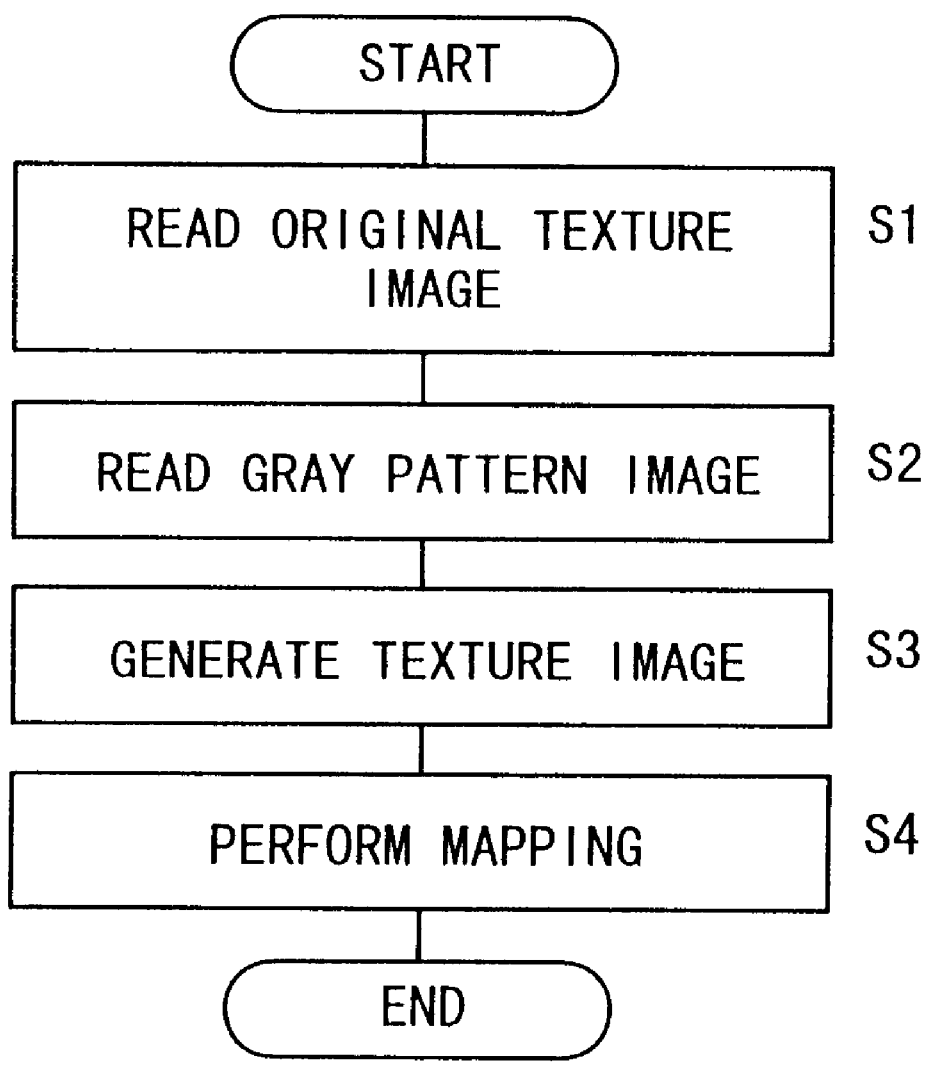
FIG. 9 is a flowchart of a first specific example of an operation sequence of the texture image generating function or means shown in FIG. 2.

In step S1 shown in FIG. 9, an original texture image Ia is read from the image memory 74. In step S2, a gray pattern image Ib is read from the image memory 74.

In step S3, the first combining means 108 combines the original texture image Ia with the gray pattern image Ib according to the alpha blending process to generate a first combined texture image Ie. While the first combined texture image Ie is expressed according to the equation (1), it is represented as a product Ia×Ib=Ie for an easier understanding of the present invention.

The intensity of the colors of the first combined texture image Ie depends on the luminance of each of the pixels of the gray pattern image Ib. The first combined texture image Ie is representative of the original texture image Ia, which is normally colored, as luminance-modulated by the shades of the pixels of the gray pattern image Ib. Consequently, the first combined texture image Ie comprising a special effect image can easily be generated with a simple arrangement.

In step S4, a texture image Ij supplied as the first combined texture image Ie to one of the inputs of the mapping means 120 by the selecting means 116 is mapped onto a shaped surface Op supplied to the other input of the mapping means 120 by the mapping means 120 thereby to produce a mapped image Ik.

The mapped image Ik has a simulated nonsmooth surface that is provided on the original texture image Ia as two-dimensionally luminance-modulated according to the shades of the gray pattern image Ib.

Figure 10:
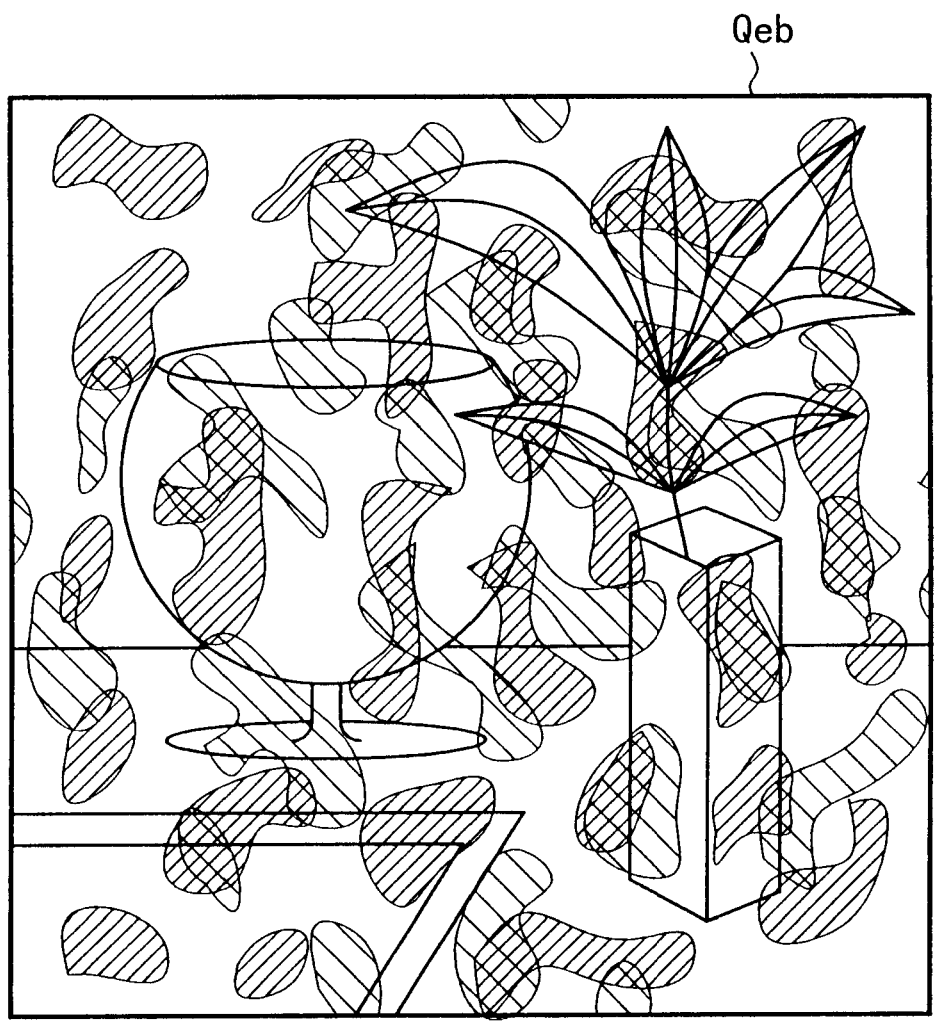
FIG. 10 is a view showing a first combined texture image picture.

FIG. 10 shows a first combined texture image picture Qeb which corresponds to the first combined texture image Ie (the texture image Ij, the mapped image Ik) that is produced by combining the gray pattern image picture Qb, which is a monochromatic image picture corresponding to the gray pattern image Ib, shown in FIG. 5 and the original texture image picture Qa, which is a colored image picture corresponding to the original texture image Ia, shown in FIG. 3.

Figure 11:
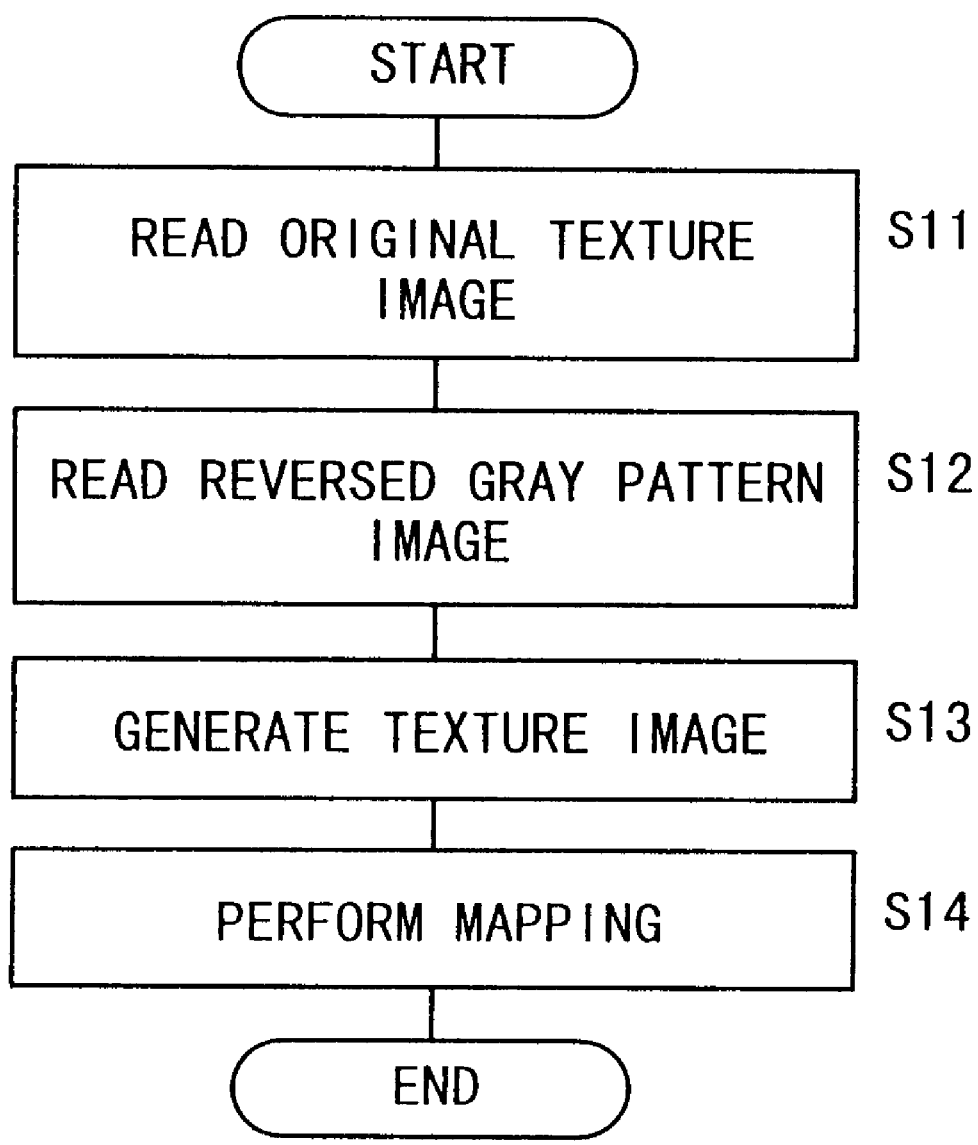
FIG. 11 is a flowchart of a second specific example of the operation sequence of the texture image generating function or means shown in FIG. 2.

FIG. 11 shows a second specific example of the operation sequence of the texture image generating function according to the first embodiment shown in FIG. 2.

The second specific example differs from the first specific example shown in FIG. 9 in that the processing in step S2 is replaced with the processing in step S12. In step S12, the reversed gray pattern image Id from the reversing means 102 is read. Specifically, according to the second specific example, the selecting means 104 is switched over to supply the reversed gray pattern image Id to the first combining means 108 and the selecting means 106 is switched over to supply the gray pattern image Ib to the second combining means 112. Otherwise, the processing in steps S11–S14 is carried out in a manner similar to the processing in steps S1–S4 shown in FIG. 9.

In the second specific example, the first combined texture image Ie generated by the first combining means 108 is representative of the original texture image Ia as luminance-modulated by the shades of the pixels of the reversed gray pattern image Id. The first combined texture image Ie is also represented as a product Ia×Ib=Ie for an easier understanding of the present invention. The mapped image Ik generated by the mapping means 120 has a simulated nonsmooth surface, similar to the mapped image Ik according to the first specific example, that is provided on the original texture image Ia as two-dimensionally luminance-modulated according to the shades of the reversed gray pattern image Ic (Id).

Figure 12:
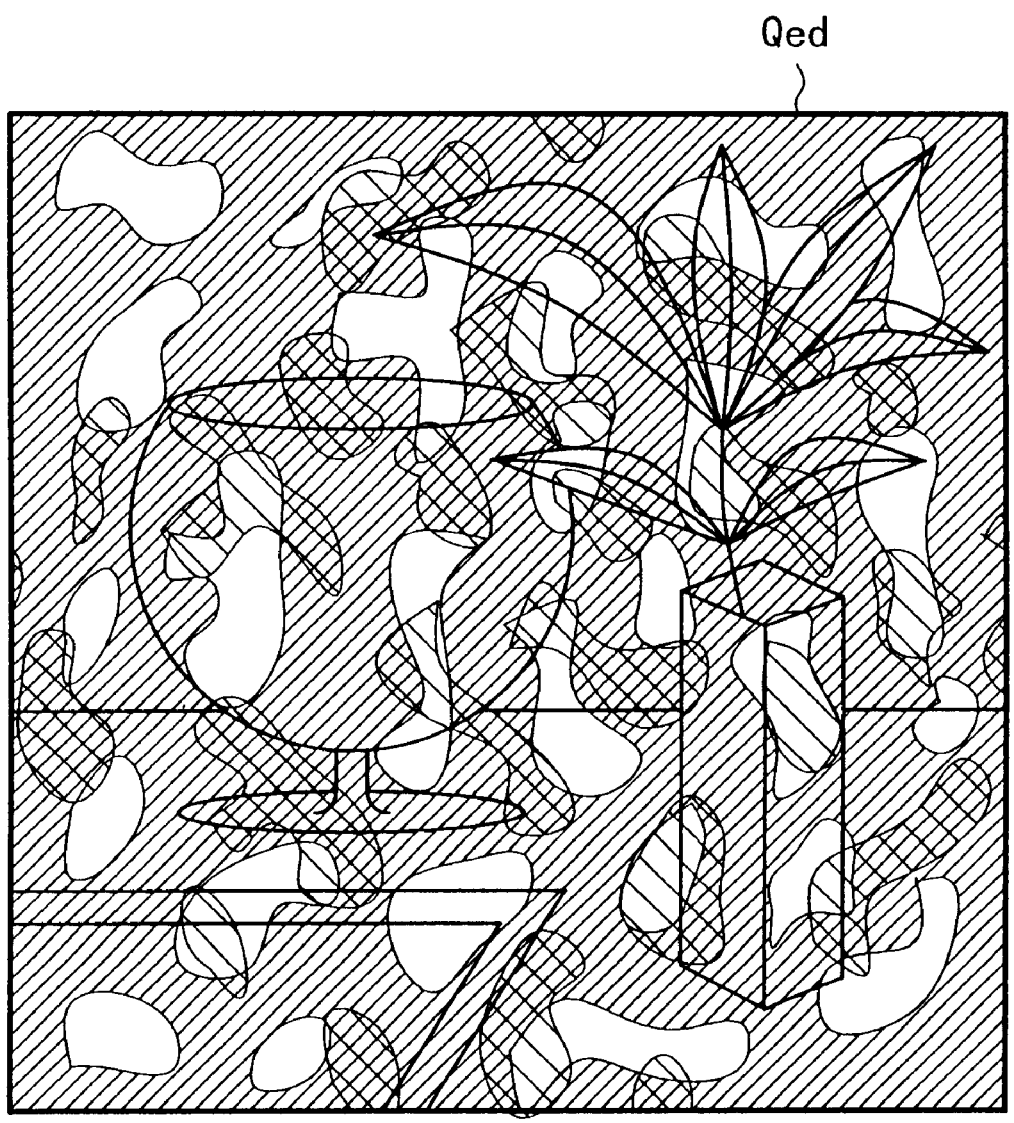
FIG. 12 is a view showing another first combined texture image.

FIG. 12 shows a first combined texture image picture Qed which corresponds to the first combined texture image Ie (the texture image Ij, the mapped image Ik) that is produced by combining the reversed gray pattern image picture Qd shown in FIG. 8 and the original texture image picture Qa shown in FIG. 3.

Figure 13:
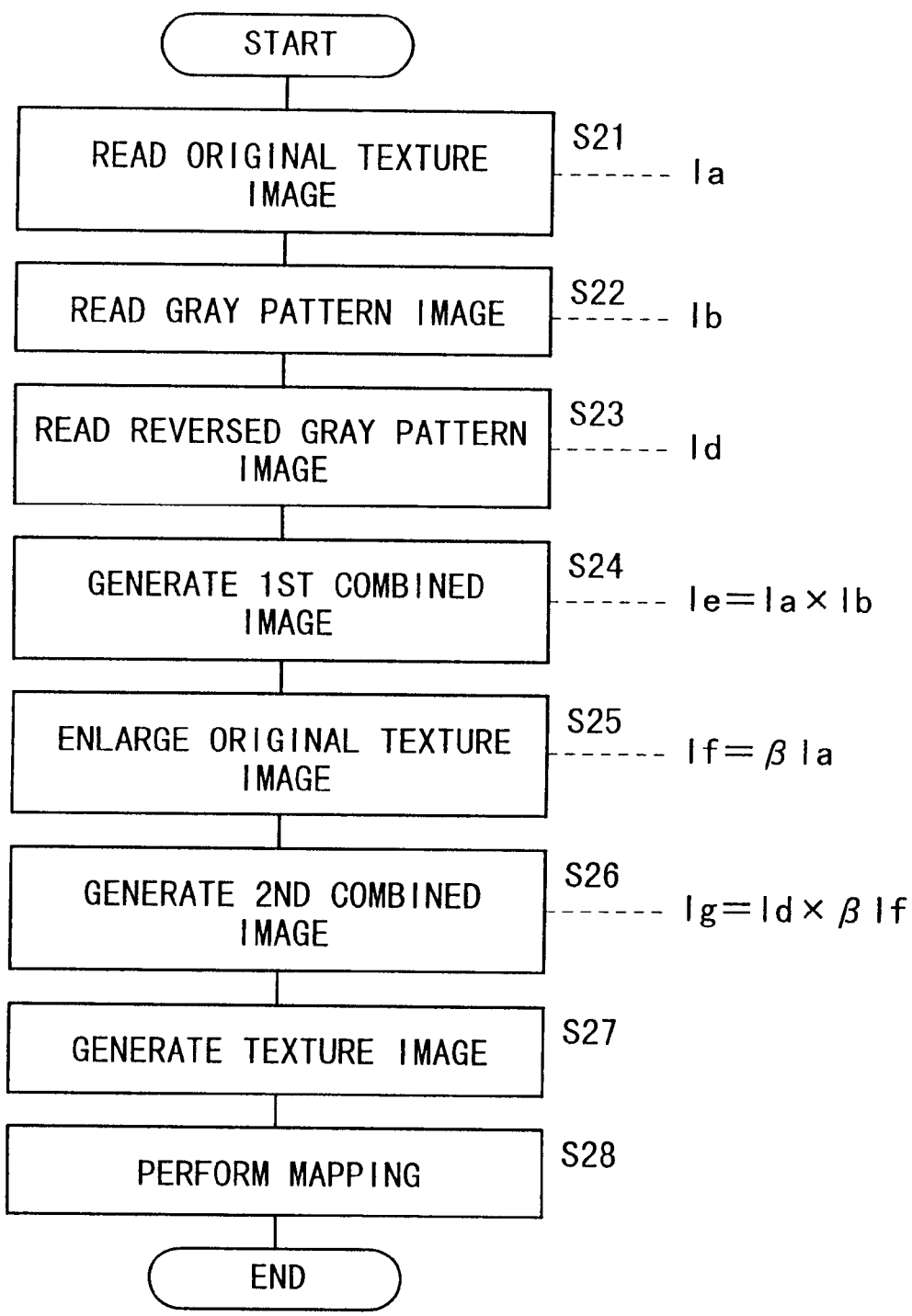
FIG. 13 is a flowchart of a third specific example of the operation sequence of the texture image generating function or means shown in FIG. 2.

FIG. 13 shows a third specific example of the operation sequence of the texture image generating function according to the first embodiment shown in FIG. 2.

In the third specific example, an original texture image Ia, a gray pattern image Ib, and a reversed gray pattern image Id are read from the image memory 74 respectively in steps S21, S22, S23.

In step S24, the gray pattern image Ib or the reversed gray pattern image Id is selected by the selecting means 104, and combined with the original texture image Ia according to the alpha blending process by the first combining means 108, thus generating a first combined texture image Ie. In this example, the gray pattern image Ib is selected to generate a first combined texture image Ie represented by Ie=Ia×Ib.

Figure 14:
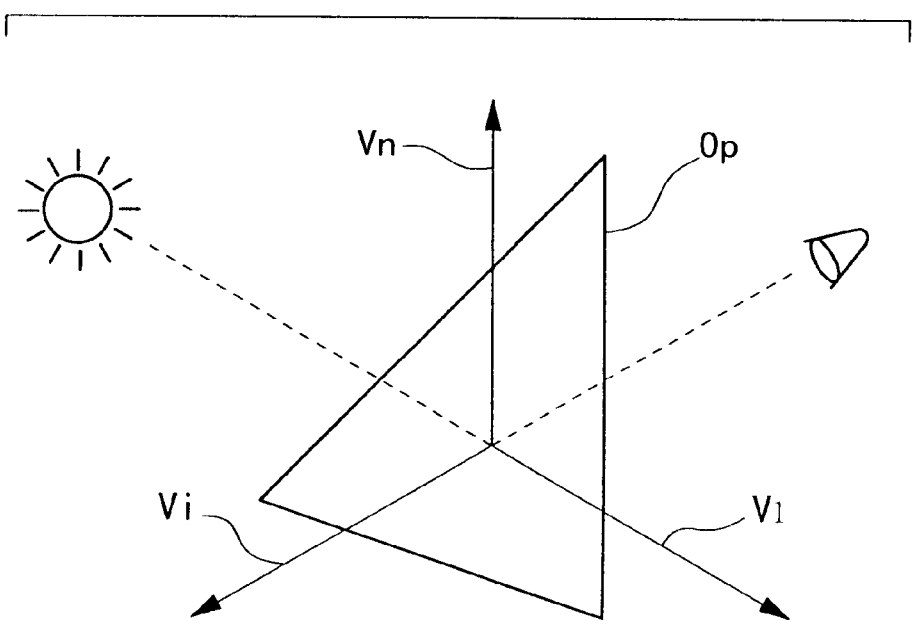
FIG. 14 is a diagram illustrative of the manner in which an enlargement ratio is derived.

In step S25, the enlarging means 110 enlarges the original texture image Ia at an enlargement ratio $\beta$ determined according to a value calculated based on attributes Opa, which include the direction of a normal vector Vn, the direction of a line-of-sight vector Vi, and the direction of an imaginary light source vector Vl, of a shaped surface Op shown in FIG. 14, e.g., the direction of a vector obtained from a vector product of Vn, Vi, Vl, a vector product of Vn, Vi, or a vector product of Vn, Vl, and outputs an enlarged original texture image If (If=$\beta$Ia).

At this time, the original texture image Ia shown in FIG. 4 is enlarged radially outwardly from a two-dimensional central position 122, i.e., a point contacted by respective vertexes of pixels ij=22, 23, 32, 33, of the original texture image Ia. Usually, the enlargement ratio $\beta$ is selected from a range of $\beta$=1–2, preferably 1.1–2. However, the enlargement ratio $\beta$ may be of a larger value.

In step S26, one of the gray pattern image Ib and the reversed gray pattern image Id, which has not been selected in step S24, i.e., the reversed gray pattern image Id, and the enlarged original texture image If are combined according to the alpha blending process by the second combining means 112, thus generating a second combined texture image Ig.

For an easier understanding of the present invention, the second combined texture image Ig is represented by Ig=Id×If=Id×$\beta$Ie.

Figure 15:
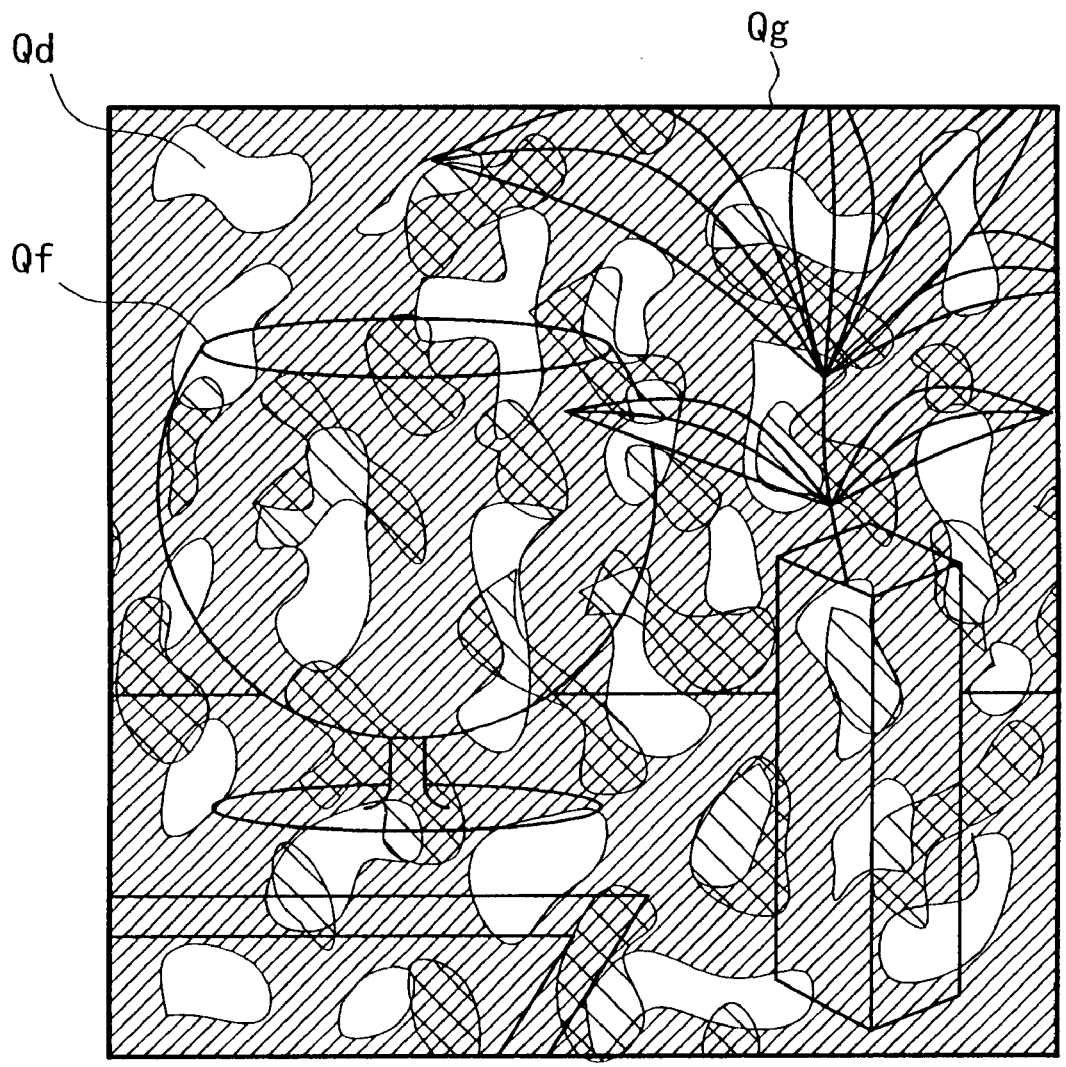
FIG. 15 is a view showing a second combined texture image picture.

FIG. 15 shows a second combined texture image picture Qg corresponding to the second combined texture image Ig, produced by combining the reversed gray pattern image picture Qd shown in FIG. 8 and an enlarged original texture image picture Qf corresponding to the enlarged original texture image If.

In step S27, the first combined texture image Ie and the second combined texture image Ig are combined with each other according to the alpha blending process by the third combining means 115, thus generating a third combined texture image Ih, which is represented by Ih=Ie+Ig for an easier understanding of the present invention.

The ratio α for the first combined texture image Ie or the second combined texture image Ig is set to a suitable value in the rang from 0 to 1, usually a value α=0.5, meaning the combining of images at a ratio of 1:1.

The third combined texture image Ih thus generated is selected as a texture image Ij by the third combining means 116. In step S28, the mapping means 120 maps the texture image Ij onto the shaped surface Op, thereby producing a mapped image Ik.

For an easier understanding of the present invention, the mapped image Ik is produced by mapping the texture image Ij, expressed by the equation (2) shown below, onto the shaped surface Op:

$$Ij=Ih=Ie+Ig=(Ib\times Ia)+(Id\times \beta Ia) \quad (2)$$

Since the enlargement ratio β for enlarging the original texture image Ia is derived from the value produced based on the attributes Opa of the shaped surface Op, the mapped image Ik can express the texture of a mirror or metal surface which has surface irregularities in a manner similar to bump mapping.

Figure 16:
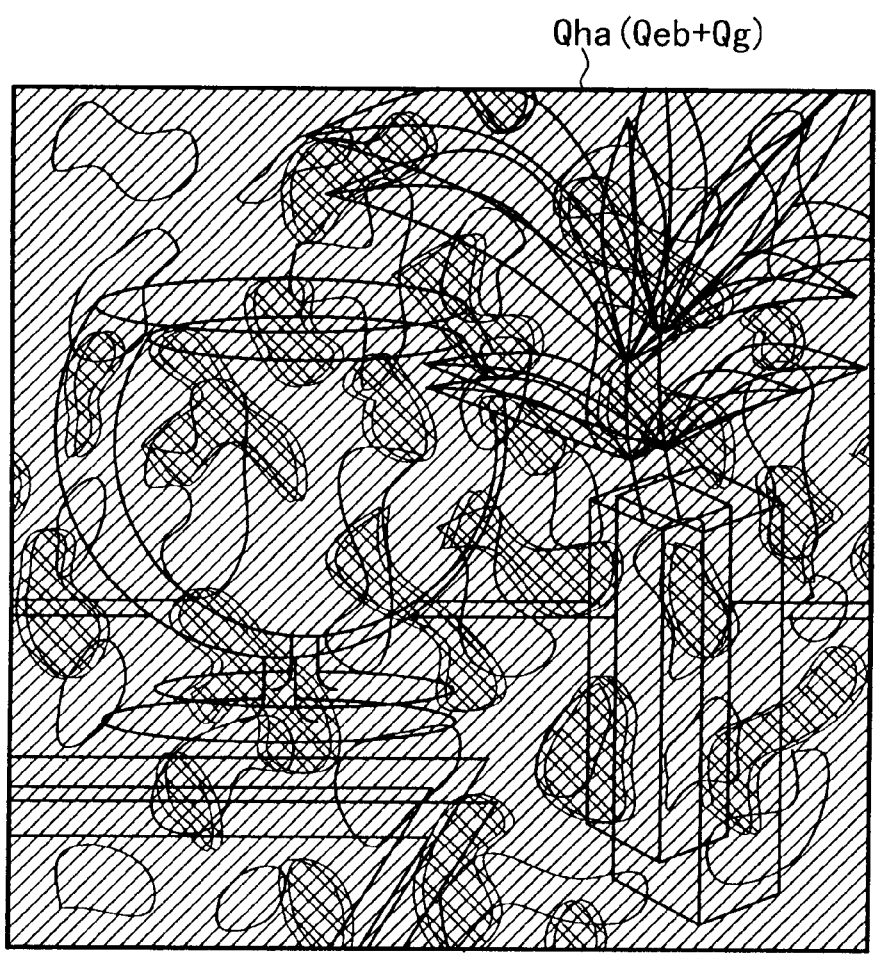
FIG. 16 is a view showing a third combined texture image picture.

FIG. 16 shows a third combined texture image picture Qha corresponding to the third combined texture image Ih, produced by combining the first combined texture image picture Qeb (see FIG. 10) corresponding to the first combined texture image Ie and the second combined texture image picture Qg (see FIG. 15) corresponding to the second combined texture image Ig according to the alpha blending process.

Figure 17:
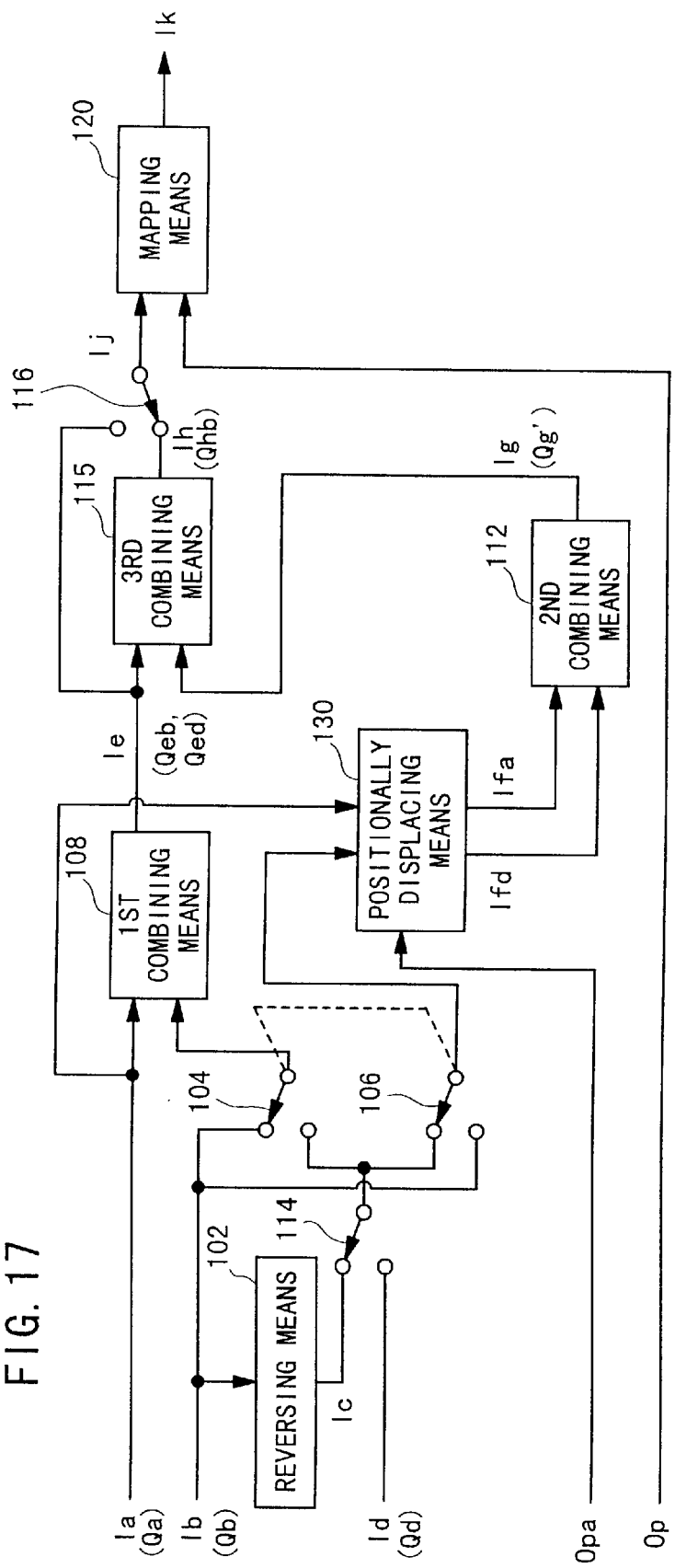
FIG. 17 is a functional block diagram of a texture image generating function or means according to a second embodiment of the present invention.

FIG. 17 shows in function block form an image processing (three-dimensional CG processing) program, i.e., a texture image generating function or a texture image generating means, according to a second embodiment of the present invention, performed by the rendering engine 70, which carries out a rendering process on a three-dimensional shape (3D model) based on rendering commands from the MPU 12, and the MPU 12 and the GET 13 which control the rendering engine 70.

Those parts shown in FIG. 17 which are identical to those shown in FIG. 2 are denoted by identical reference characters, and will not be described in detail below.

The second embodiment differs from the first embodiment in that the enlarging means 110 according to the first embodiment is replaced with a positionally displacing means 130.

The positionally displacing means 130 is supplied with the original texture image Ia and either the gray pattern image Ib or the reversed gray pattern image Id which is outputted from the selecting means 106 but not supplied to the first combining means 108. The positionally displacing means 130 is also supplied with the attributes Opa, which include the direction of a normal vector Vn, the direction of a line-of-sight vector Vi, and the direction of an imaginary light source vector Vl, of the shaped surface Op shown in FIG. 14.

The positionally displacing means 130 outputs a positionally displaced original texture image Ifa whose central position has been displaced upwardly, downwardly, leftwardly, and rightwardly by a desired number of pixels, and a positionally displaced gray pattern image or reversed gray pattern image Ifd that is the gray pattern image Ib or reversed gray pattern image Id whose central position has been displaced similarly, to the second combining means 112.

A specific example of an operation sequence of the texture image generating function according to the second embodiment shown in FIG. 17, based on the image processing program stored in the OSDROM 26, will be described below with reference to FIG. 18.

Figure 18:
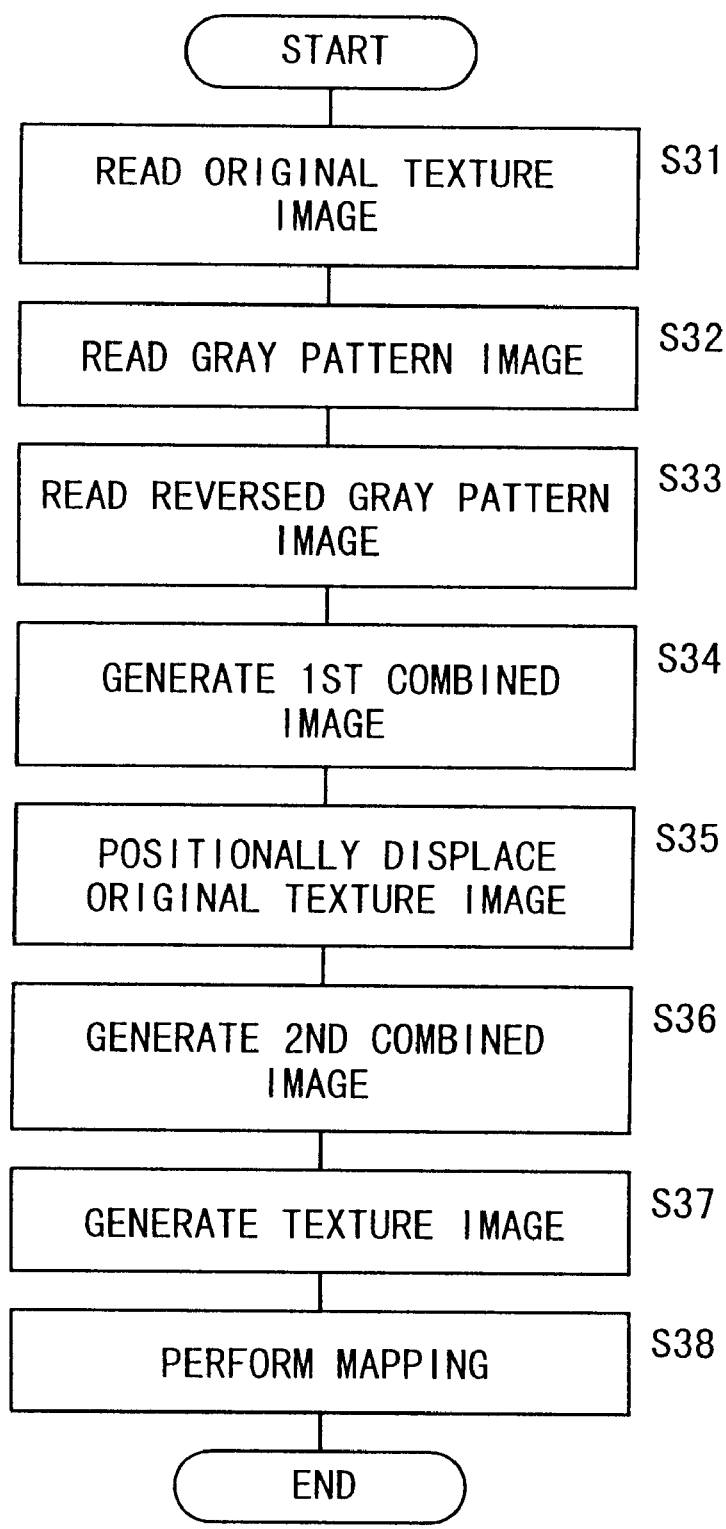
FIG. 18 is a flowchart of an operation sequence of the texture image generating function or means shown in FIG. 17.

FIG. 18 shows the operation sequence of the texture image generating function or means shown in FIG. 17.

The processing in step S31 through step S34 shown in FIG. 18 is the same as the processing in step S21 through step S24 shown in FIG. 13.

Specifically, an original texture image Ia, a gray pattern image Ib, and a reversed gray pattern image Id are read from the image memory 74 respectively in steps S31, S32, S33. In step S34, the gray pattern image Ib, for example, is combined with the original texture image Ia according to the alpha blending process by the first combining means 108, thus generating a first combined texture image Ie (Ie=Ia×Ib).

In step S35, the positionally displacing means 130 positionally displaces the pixels of the original texture image Ia by an upward, downward, leftward, and rightward positional displacement p determined according to a value calculated based on attributes Opa, which include the direction of a normal vector Vn, the direction of a line-of-sight vector Vi, and the direction of an imaginary light source vector Vl, of a shaped surface Op shown in FIG. 14, e.g., the direction of a vector obtained from a vector product of Vn, Vi, Vl, a vector product of Vn, Vi, or a vector product of Vn, Vl, and outputs a positionally displaced original texture image Ifa (Ifa=pIa). The positional displacement p can be selected as an arbitrary value depending on the actual original texture image Ia.

Similarly, the positionally displacing means 130 positionally displaces the pixels of the reversed original texture image Id by the same positional displacement p, and outputs a positionally displaced reversed original texture image Ifd (Ifd=pId).

Specifically, as shown in FIG. 19, if the original texture image Ia is to be displaced 2 pixels rightwardly and 2 pixels upwardly, then the positional displacement p is expressed by p (i, j)=p (2, 2), and the pixel data of a pixel Ia32, for example, in the original texture image Ia becomes the pixel data of a pixel Ia14 in the original texture image Ia or the pixel data of a pixel Ia32 in the positionally displaced original texture image pIa. Actually, since the original texture image Ia has a size of several hundred pixels×several hundred pixels, the positionally displaced original texture image pIa is equivalent to the original texture image Ia whose center has been displaced.

Likewise, the pixel data of a pixel Id42, for example, in the reversed original texture image Id becomes the pixel data of a pixel Id24 in the reversed original texture image Id. When the reversed original texture image Id is thus positionally displaced, the values of the alpha channel data α are also displaced.

In step S36, the positionally displaced original texture image Ifa (Ifa=pIa) and the positionally displaced gray pattern image Ifd (Ifd=pId) are combined according to the alpha blending process by the second combining means 112, thus generating a second combined positionally displaced texture image Ig.

For an easier understanding of the present invention, the second combined positionally displaced texture image Ig is represented by Ig=Ifa×Ifd=pIa×pId.

In step S37, the first combined texture image Ie and the second combined texture image Ig are combined with each other according to the alpha blending process by the third combining means 115, thus generating a third combined texture image Ih, which is represented by Ih=Ie+Ig for an easier understanding of the present invention.

The ratio α for the first combined texture image Ie or the second combined texture image Ig is set to a suitable value in the range from 0 to 1, usually a value α=0.5.

The third combined texture image Ih thus generated is selected as a texture image Ij by the third combining means 116. In step S38, the mapping means 120 maps the texture image Ij onto the shaped surface Op, thereby producing a mapped image Ik.

For an easier understanding of the present invention, the mapped image Ik is produced by mapping the texture image Ij, expressed by the equation (3) shown below, onto the shaped surface Op:

$$Ij=Ih=Ie+Ig=(Ib \times Ia)+(pId \times pIa) \qquad (3)$$

Since the positional displacement p for positionally displacing the original texture image Ia and the reversed gray pattern image Id is derived from the value produced based on the attributes Opa of the shaped surface Op, the mapped image Ik can simulatively express the texture of a surface which has surface irregularities and reflects light by way of diffuse reflection.

Figure 20:
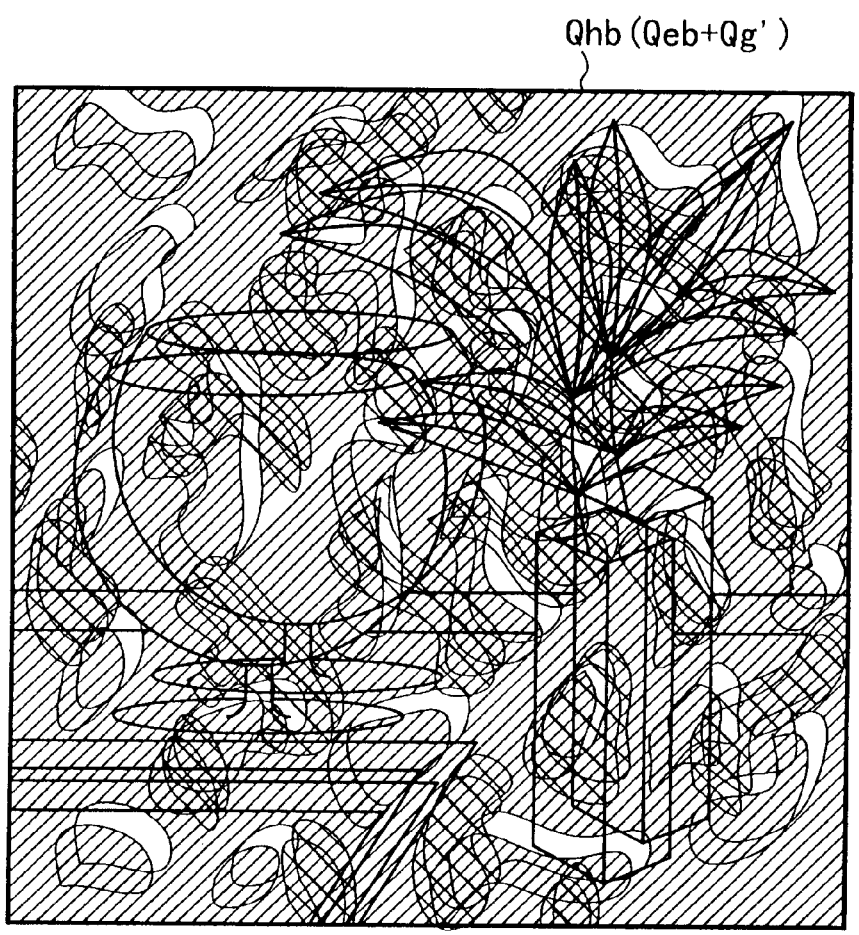
FIG. 20 is a view showing another third combined texture image picture.

FIG. 20 shows a third combined texture image picture Qhb corresponding to the third combined texture image Ih, produced by combining the first combined texture image picture Qeb (see FIG. 10) corresponding to the first combined texture image Ie and a second combined texture image picture Qg' (not shown) corresponding to the second combined texture image Ig according to the alpha blending process.

Figure 21:
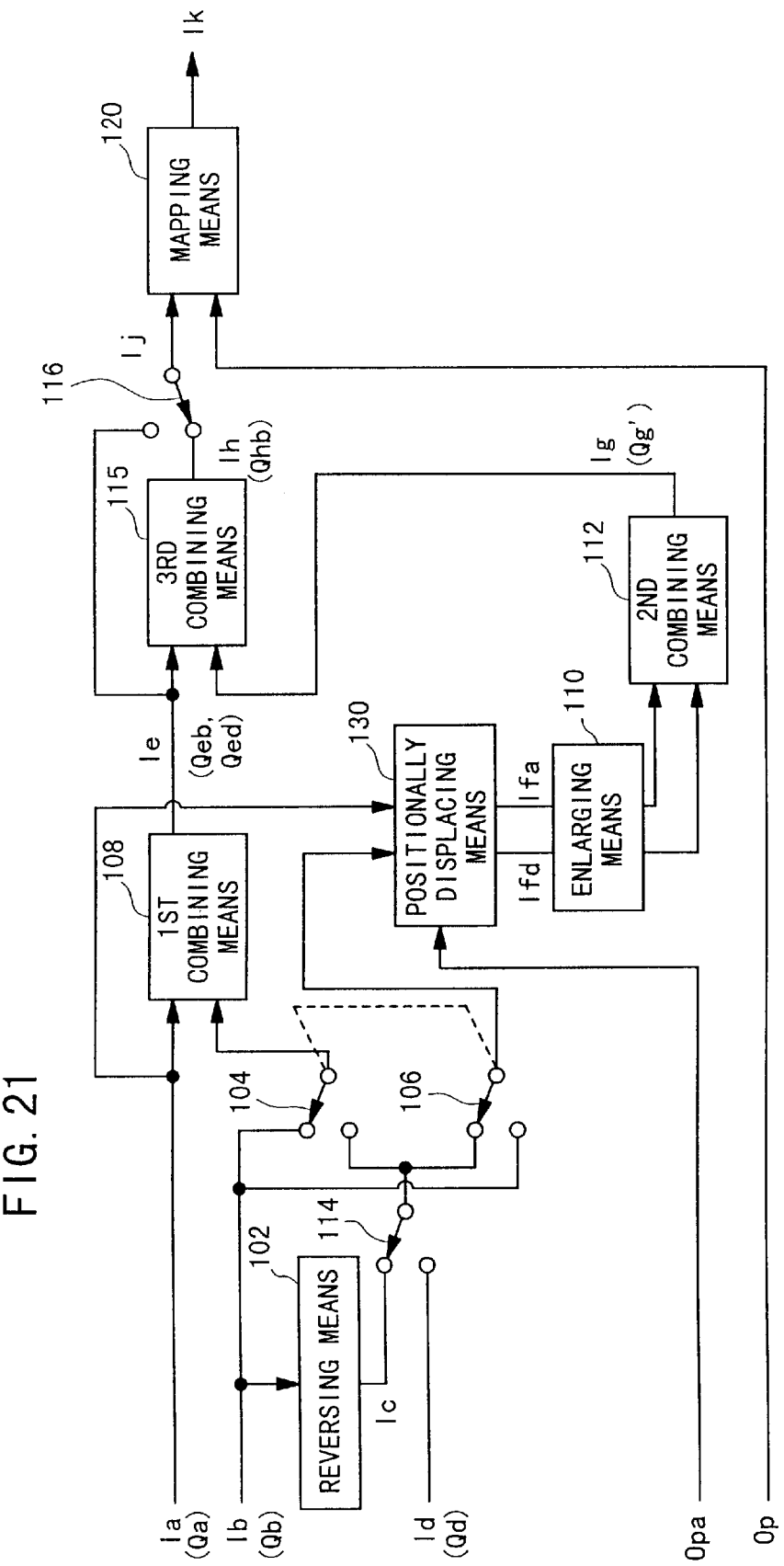
FIG. 21 is a functional block diagram of a texture image generating function or means according to a third embodiment of the present invention.

The texture image generating function or means according to the first embodiment shown in FIG. 2 and the texture image generating function or means according to the second embodiment shown in FIG. 17 may be combined with each other such that the enlarging means 110 shown in FIG. 2 is inserted between the positionally displacing means 130 and the second combining means 112 shown in FIG. 17, thus providing a texture image generating function or means according to a third embodiment of the present invention as shown in FIG. 21. The texture image generating function or means according to the third embodiment is capable of producing a texture image expressing a nonsmooth surface more effectively based on a combination of the enlargement and positional displacement of images.

Images can be enlarged and positionally displaced simultaneously.

Specifically, a polygon that is a shaped surface Op onto which a texture image is mapped has a normal vector N (X, Y, Z) having different components in a three-dimensional coordinate system at the coordinates of each of the vertexes of the shaped surface.

It is assumed that the texture image has a size of U pixels×V pixels=256 pixels×256 pixels, for example. The X component (normalized in a range from −1 to 1) of the normal vector at the time the polygon is converted into a polygon in a screen coordinate system is multiplied by θ (e.g., 0.2)×U (256), producing a value θU, and a value (u+θU) produced by adding the value θU to a value u (ranging from 0 to 255 on the U-axis) of the texture image is used as a new value u.

The Y component (normalized in a range from −1 to 1) of the normal vector at the time the polygon is converted into a polygon in the screen coordinate system is multiplied by θ×V (0.2×256), producing a value θV, and a value (v+θV) produced by adding the value θV to a value v (ranging from 0 to 255 on the V-axis) of the texture image is used as a new value v.

In this manner, it is possible to produce an adequately effective image. Since the enlargement ratio (reduction ratio or positional displacement) θ depends on the rendering apparatus involved, the 3D rendering algorithm, and the coordinate system used, the enlargement ratio largely differs from system to system.

According to another embodiment of the present invention, the concept that the reversed gray pattern image Id is related to the gray pattern image Ib as a negative and a positive are a reversal of each other is applied to a gray pattern image Ib having gradation values ranging from 0 to 255 which is divided into three or more gray pattern images. If the gray pattern image Ib is divided into three gray pattern images, for example, then pixel values are distributed in a negative-positive reversal manner on opposite sides of the boundaries of the three areas. On opposite sides of each of the boundaries, the pixel values progressively increase toward and progressively decrease from the boundary. However, if the boundary is at a position "0", then the pixel values only progressively increase toward the boundary, and if the boundary is at a position "255", then the pixel values only progressively decrease from the boundary. Such three gray pattern images are combined with the original texture image Ia at suitable ratios, respectively, a more effective image can be produced.

A process of processing a gray pattern image Ib having gradation values ranging from 0 to 255 to divide it into five gray pattern images will be described below with reference to FIG. 22.

Figure 22:
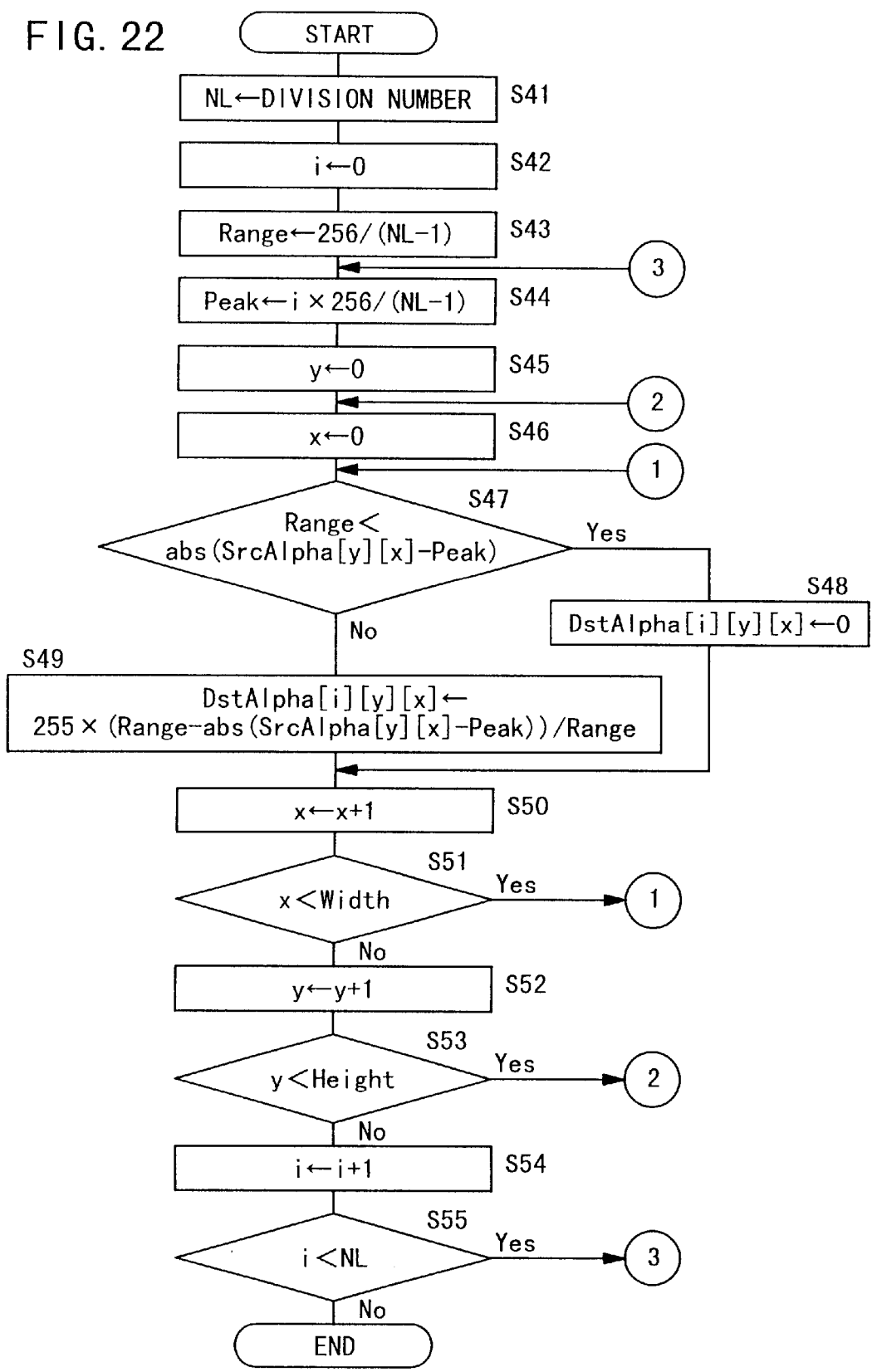
FIG. 22 is a flowchart of a process of dividing a gray pattern image.

The process shown in FIG. 22 is a specific example of a texture image generating function or means (an original texture image processing function and a gray pattern image processing function). Such an original texture image processing function and a gray pattern image processing function are stored as a program in the OSDROM 26, for example.

As indicated by the gray pattern image picture Qb in FIG. 5, the gray pattern image Ib comprises monochromatic image data having differently shaded regions in different two-dimensional positions (xy positions).

Figure 23:
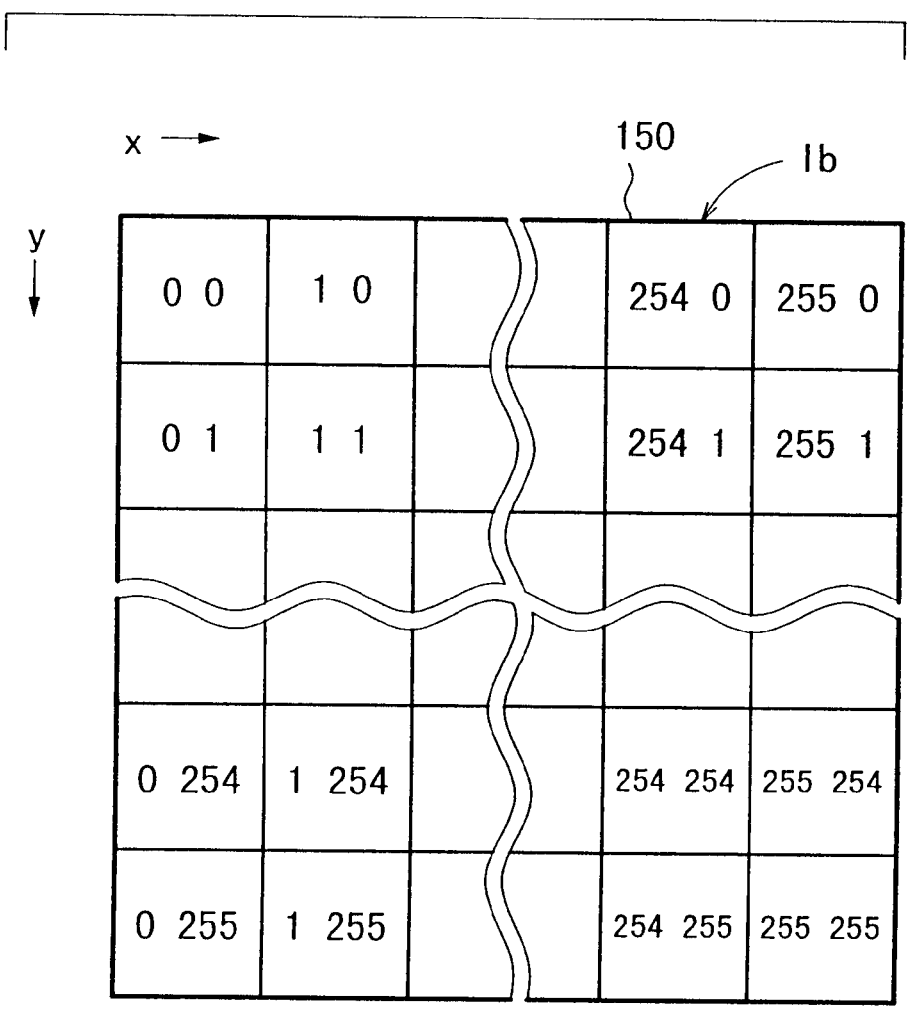
FIG. 23 is a diagram showing a matrix of the gray pattern image.

In the example shown in FIG. 22, an image storing means comprises a memory buffer 150 shown in FIG. 23 which includes 256 pixels in the x direction (for the ease of flowcharting, x coordinates span a width Width=255 (256−1)) and 256 pixels in the y direction (for the ease of flowcharting, y coordinates span a height Height=255 (256−1)), and hence have a total number of 65536 pixels. The memory buffer 150 comprises a portion of the image memory 74.

Each of the pixels (x, y) of the memory buffer 150 stores gray gradation data (also referred to as "pixel data" or "pixel values") each having a value ranging from 0 to 255. Although the gray pattern image Ib may have image data representing the gray pattern image picture Qb shown in FIG. 5, the gray pattern image Ib in this example comprises a gray pattern image SrcAlpha[y][x], to be divided, whose luminance, as shown in FIG. 24, is of a maximum level of 255 at an uppermost and leftmost pixel (0, 0), becomes progressively lower downwardly to the right, is of an intermediate level 127 on a diagonal line interconnecting a pixel (255, 0) and a pixel (0, 255), further becomes progressively lower downwardly to the right, and is of a minimum level of 0 at a lowermost and rightmost pixel (255, 255).

Figure 24:
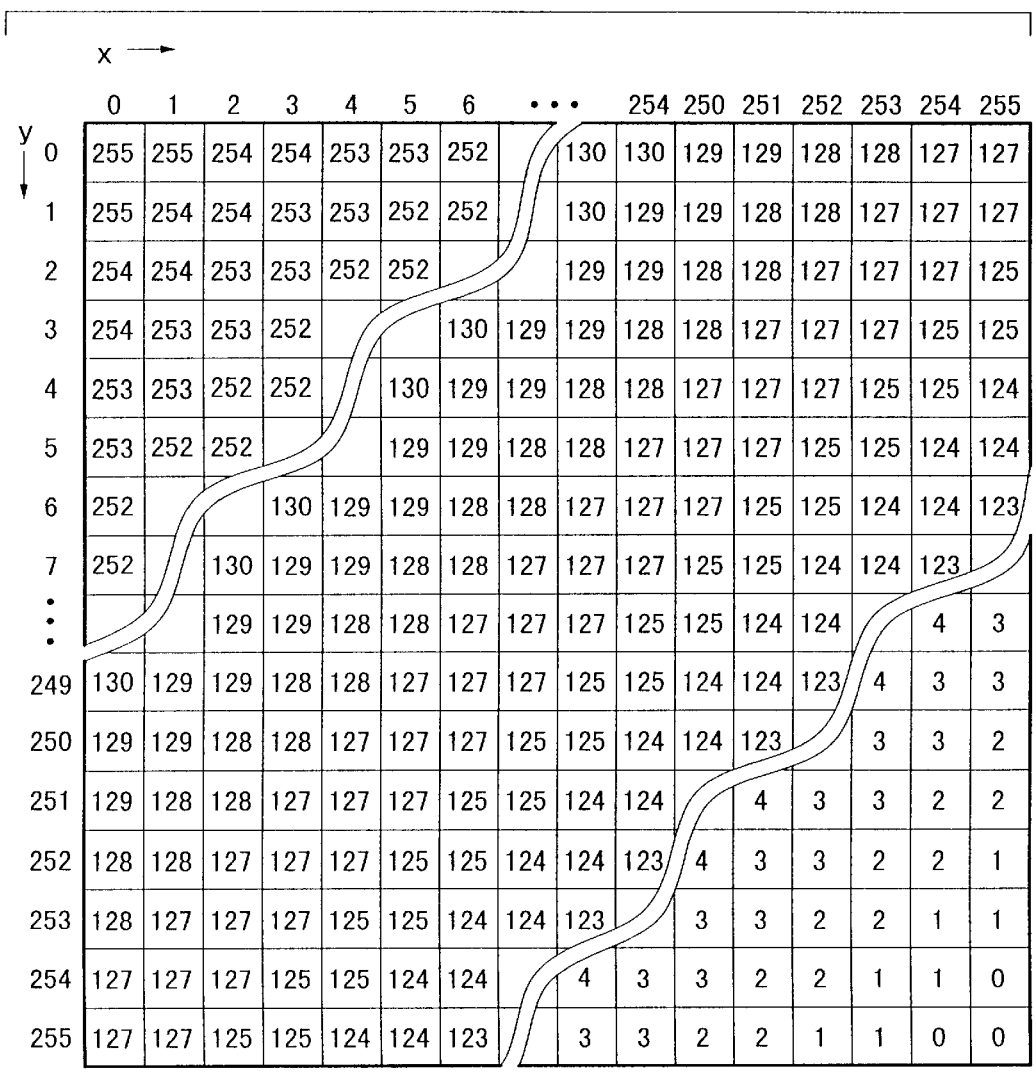
FIG. 24 is a diagram showing image data of a gray pattern image.

In the example shown in FIG. 22, therefore, the gray pattern image SrcAlpha[y][x] shown in FIG. 24 is stored in the memory buffer 150.

In step S41 shown in FIG. 22, the division number NL, i.e., the number of divisions into which the gray pattern image SrcAlpha[y][x] is to be divided, is set to NL=5. The division number NL is a parameter for processing the pixel values (which are luminance values, but may also be regarded as shade values) stored in the coordinates (memory addresses) xy of the single gray pattern image SrcAlpha[y][x] according to a desired algorithm to divide the gray pattern image SrcAlpha[y][x] into a plurality of (five in this example) processed gray pattern images DstAlpha[i][y][x].

The symbol [i] in the processed gray pattern images DstAlpha[i][y][x] represents the order i (i=0, 1, 2, 3, 4: five divisions) of the division number NL.

In step S42, the order i is set to i=0 in order to select the first gray pattern images DstAlpha[i][y][x].

Then, a gradation number range Range that can be employed in each division range is determined according to the following fourth equation (4):

$$\text{Range} = 256/(NL-1) \qquad (4)$$

At this time, the gradation number range Range is determined as Range=256/(5−1)=64.

Then, a peak value Peak in each division range is determined according to the following fifth equation (5):

$$\text{Peak} = I \times 256/(NL-1) \qquad (5)$$

At this time, the peak value Peak is determined as Peak=0×256/(5−1).

In steps S45, S46, initial y, x coordinates with which to refer to the pixel data in the gray pattern image SrcAlpha are set to y=0, x=0, i.e., xy=(0, 0).

In step S47, a condition is judged according to the following inequality (6):

$$\text{Range} < \text{abs}(\text{SrcAlpha}[y][x] - \text{Peak}) \qquad (6)$$

Specifically, in step S47, it is determined whether the absolute value of a value produced by subtracting the peak value Peak from the pixel value stored in the gray pattern image SrcAlpha[y][x] is smaller than the gradation number range Range or not.

In a first cycle, since the value produced by subtracting the peak value Peak=0 from the pixel value=255 (see FIG. 24) stored in the gray pattern image SrcAlpha[y][x] is 255, and the gradation number range Range is Range=64, the inequality (6) is satisfied as 64<abs (255−0).

At this time, the coordinates (memory address) xy of the divided gray pattern images DstAlpha[i][y][x] store the pixel value according to the following equation (7):

$$\text{DstAlpha}[i][y][x] \leftarrow 0 \qquad (7)$$

At this time, the gray pattern images DstAlpha[0][0][0] is stored.

In step S50, the value of the x coordinate is incremented by 1, and used as a new x coordinate. In step S51, it is determined whether the new x coordinate (x=x+1) is smaller than the width Width=255 or not.

Since the x coordinate is x=1 at this time, control goes back to step S47 to judge the condition according to the inequality (6).

As can be understood from FIG. 24, when the y coordinate of the gray pattern image SrcAlpha[y][x] is y=0, the gray pattern image SrcAlpha[0][x] is greater than 126, and hence the condition in step S47 is not satisfied. In step S48, the value of "0" is stored in all the first gray pattern image DstAlpha[0][0][x] in the first line (y=0).

When the x coordinate becomes x=255, the condition in step S51 is satisfied. In step S52, the y coordinate is set to y=1.

In step S53, it is determined whether the incremented y coordinate is smaller than the height Height=255 or not. Since the y coordinate is y=1 at this time, the condition in step S53 is satisfied (1<255), control goes back to step S46 to set the x coordinate in the second row and the first column to x=0.

Subsequently, the coordinate values are successively scanned. In the gray pattern image SrcAlpha[y][x] shown in FIG. 24, the condition according to the inequality in step S47 becomes unsatisfied for the first time when 64<abs (63−0). It can be estimated from FIG. 24 that the condition according to the inequality in step S47 becomes unsatisfied for the first time when the y coordinate is y=128 and the x coordinate is x=255. At this time, the coordinates xy=(255, 128)= 63=SrcAlpha[128][255]. Before the condition according to the inequality in step S47 becomes satisfied, all the x, y coordinates have been processed in step S48, and hence the gray pattern DstAlpha[0][y][x] is of the value of "0" (black).

If the condition in step S47 is not satisfied, then control goes to step S49 in which the processing according to the following equation (8) is carried out:

$$\text{DstAlpha}[i][y][x] \leftarrow 255 \times (\text{Range} - \text{abs}(\text{SrcAlpha}[y][x] - \text{Peak}))/\text{Range} \qquad (8)$$

Inasmuch as 255×(64−abs(63−0))/64~4, the value of "4" is stored in the first gray pattern image DstAlpha[0][128][255].

Similarly, at the coordinates xy=(0, 255)=127, the gray pattern image DstAlpha[0][255][0] is caused to have the value of "0" according to the processing in step S48, and at the coordinates xy=(255, 255)=0, since 255×(64−abs(0−0))/ 64=255 according to the processing in step S49, the gray pattern image DstAlpha[0][255][255] is caused to have the value of "255".

Figure 25:
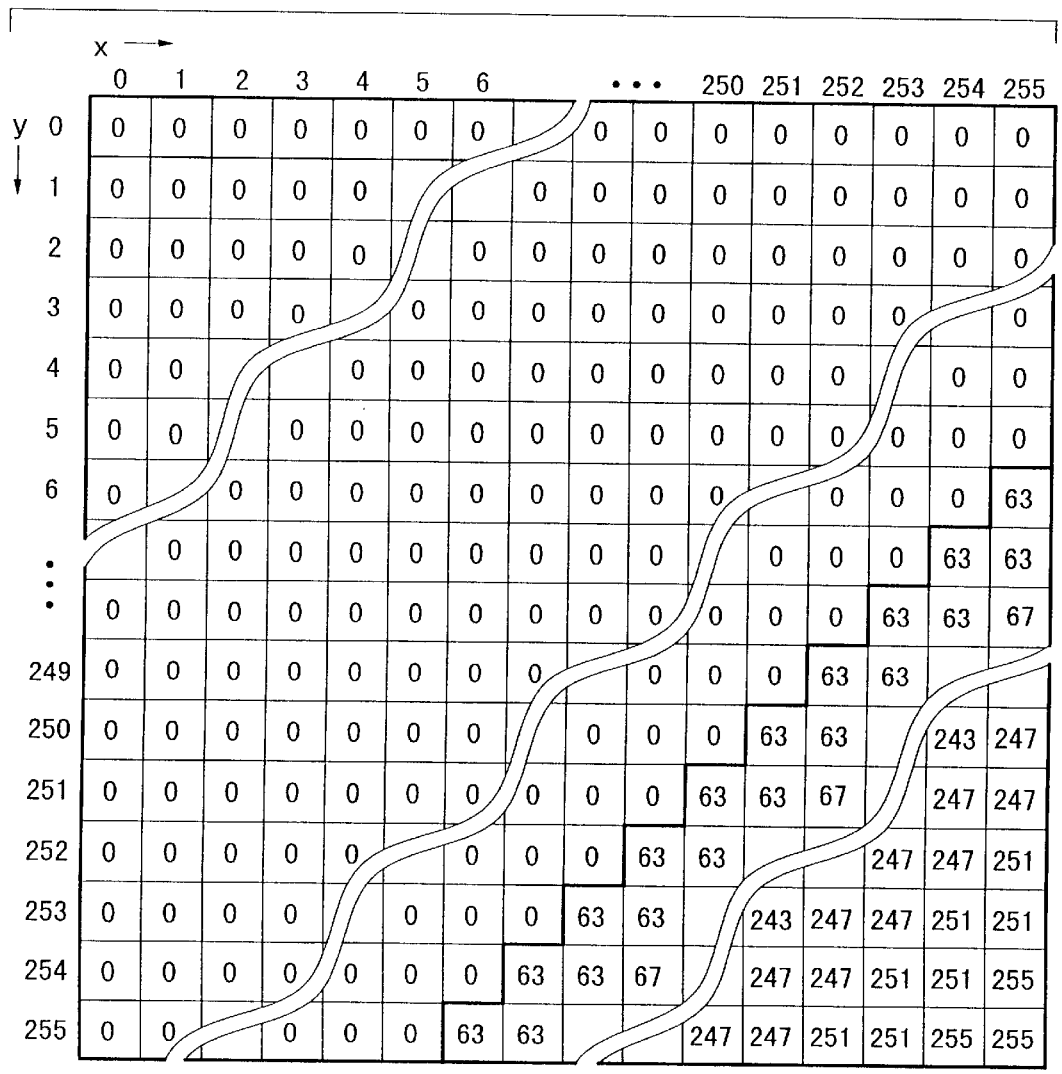
FIG. 25 is a diagram showing image data of a gray pattern image that has been divided.

When the condition in step S53 is not satisfied, therefore, the pixel values of the first gray pattern image DstAlpha[i][y][x] (i=0) are determined as shown in FIG. 25.

Image pictures of the original gray pattern SrcAlpha[y][x] and the divided gray pattern DstAlpha[i][y][x], i.e., their image pictures displayed on the display monitor, will be described below.

Figure 26:
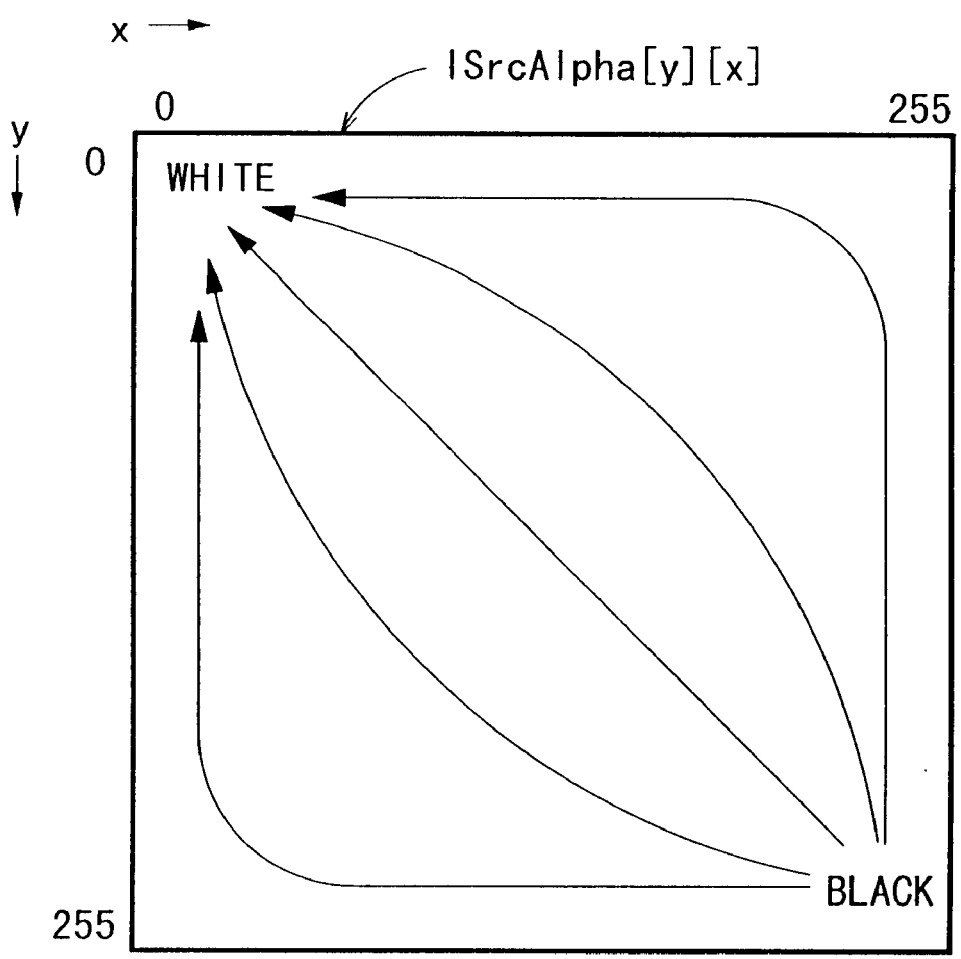
FIG. 26 is a view of the gray pattern image shown in FIG. 25.

The gray pattern image SrcAlpha[y][x] shown in FIG. 24 is displayed as a gray pattern image picture ISrcAlpha[y][x] shown in FIG. 26.

In FIG. 26, the displayed gray pattern image picture ISrcAlpha[y][x] is black in its lower right area, becomes successively dark gray, medium gray, and light gray from the black area in the directions indicated by the arrows, and is white in its upper left area.

Figure 27:
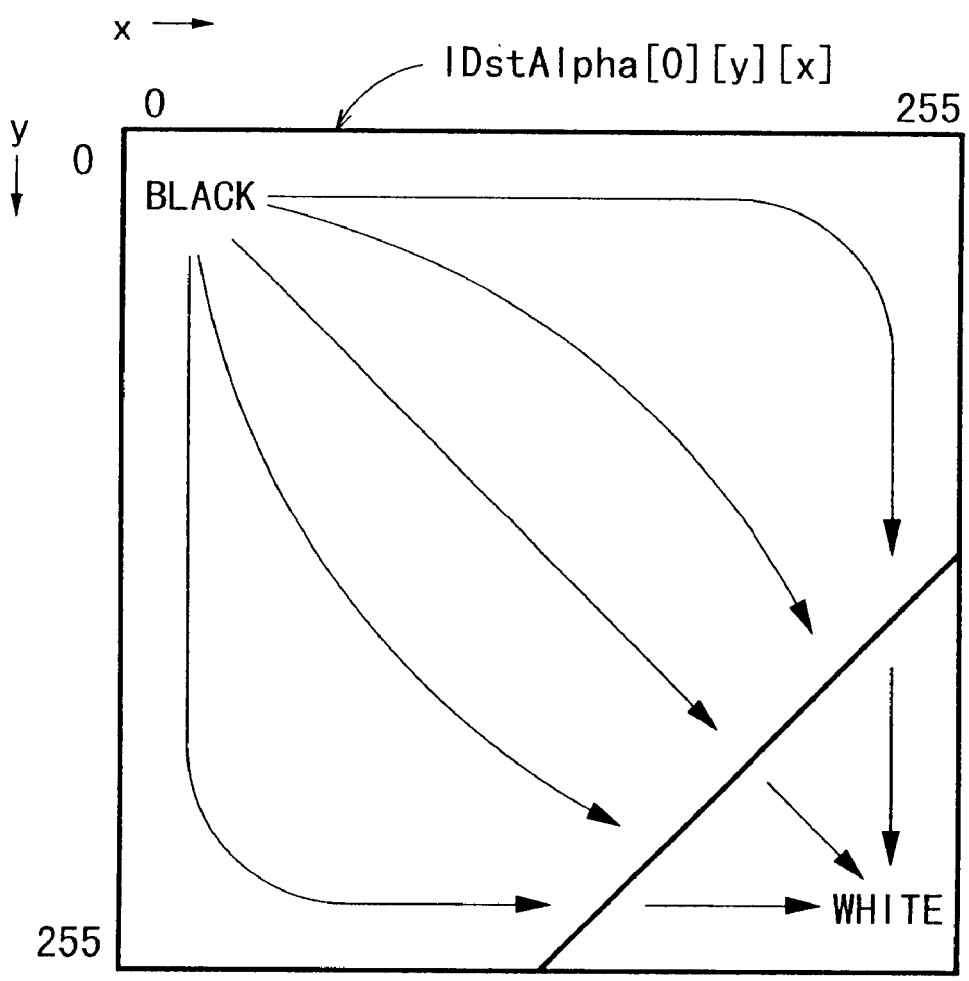
FIG. 27 is a view of the gray pattern image that has been divided.

The first divided gray pattern image DstAlpha[0][y][x] shown in FIG. 25 is displayed as a gray pattern image picture IDstAlpha[0][y][x] shown in FIG. 27. In FIG. 27, the displayed gray pattern image picture IDstAlpha[O][y][x] is black (value of "0") in about ⅞ of the entire area from the upper left area downwardly to the right, becomes successively dark gray, medium gray, and light gray from the black area in the directions indicated by the arrows, and is white in its lower right area.

It can be understood that the divided gray pattern image DstAlpha[0][y][x] is a processed gray pattern image that is produced by converting the original gray pattern image SrcAlpha[y][x] according to the desired shade converting algorithm shown in FIG. 22.

Then, a second divided gray pattern image DstAlpha[1][y][x] is generated.

When the generation of the first divided gray pattern image DstAlpha[0][y][x] is finished, i.e., when the condition in step S53 is not satisfied, the order i is incremented by 1 in step S54, so that i=2.

When i=2, the condition in step S55 is satisfied, and the processing in step S44 and following steps is performed in a next cycle.

In this cycle, the pixel values of the second gray pattern image DstAlpha[1][y][x] whose shades are changed from those of the gray pattern image SrcAlpha[y][x] are determined in the same manner as described above.

When the condition in step S55 is finally unsatisfied, first through fifth divided gray pattern images DstAlpha[i][y][x] have been generated.

The relationship between the gray pattern image SrcAlpha[y][x] to be divided and the divided gray pattern image DstAlpha[i][y][x] will be described below with reference to FIGS. 28A through 28F.

Figure 28A:
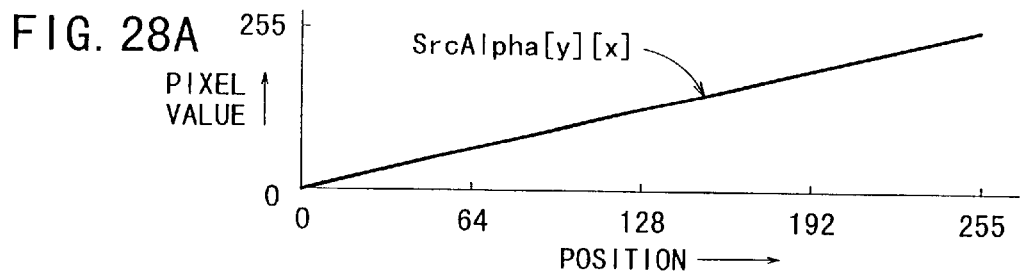
FIG. 28A is a graph showing a gray pattern image.

As can be seen from FIG. 24, the gray pattern image SrcAlpha[y][x] to be divided is represented as a straight curve extending progressively upwardly to the right, in a graph shown in FIG. 28A which has a horizontal axis indicative of pixel positions along a diagonal line extending from the lowermost and rightmost pixel to the uppermost and leftmost pixel, and a vertical axis indicative of pixel values. The horizontal axis of the graph shown in each of FIGS. 28A through 28F represents the length of a diagonal line of the square shape shown in FIGS. 29A through 29F, which is standardized by 256 values representing positions.

Figure 28B:
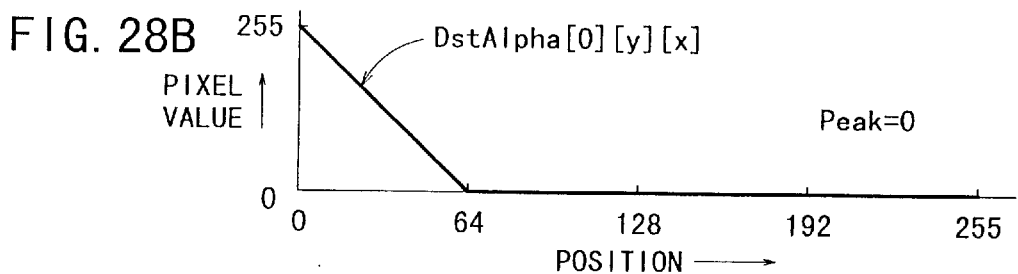
FIG. 28B is a graph showing a gray pattern image having a peak at a value of 0.

As can be seen from FIGS. 25 and 27, the first divided gray pattern image DstAlpha[0][y][x] has a peak value Peak=0 and a gradation number range Range=64, and represents the graph shown in FIG. 28B.

Figure 28C:
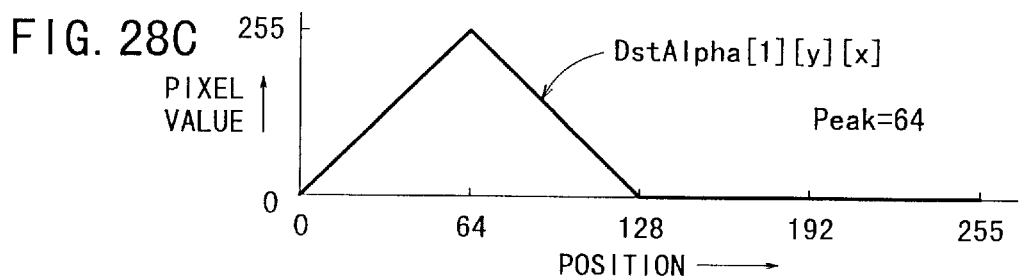
FIG. 28C is a graph showing a gray pattern image having a peak at a value of 64.

The second divided gray pattern image DstAlpha[1][y][x] has a peak value Peak=64 and a gradation number range Range=64, and represents the graph shown in FIG. 28C.

Figure 28D:
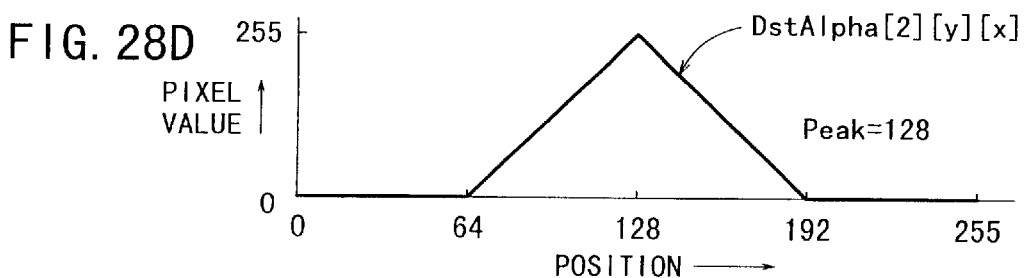
FIG. 28D is a graph showing a gray pattern image having a peak at a value of 128.

The third divided gray pattern image DstAlpha[2][y][x] has a peak value Peak=128 and a gradation number range Range=64, and represents the graph shown in FIG. 28D.

Figure 28E:
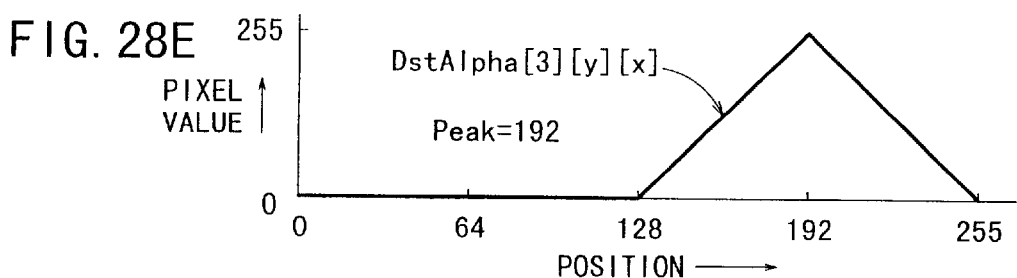
FIG. 28E is a graph showing a gray pattern image having a peak at a value of 192.

The fourth divided gray pattern image DstAlpha[3][y][x] has a peak value Peak=192 and a gradation number range Range=64, and represents the graph shown in FIG. 28E.

Figure 28F:
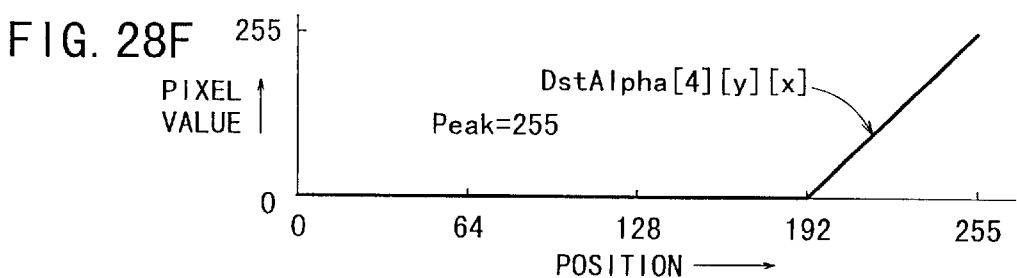
FIG. 28F is a graph showing a gray pattern image having a peak at a value of 255.
Figure 29A:
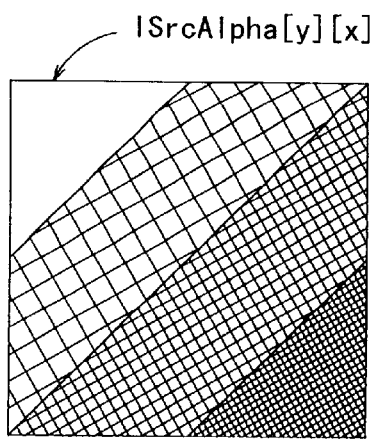
FIG. 29A is a view of an image corresponding to the image shown in FIG. 28A.
Figure 29B:
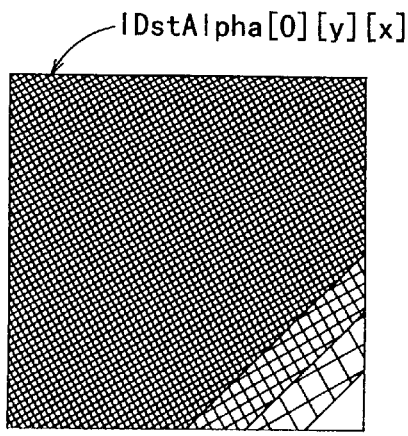
FIG. 29B is a view of an image corresponding to the image shown in FIG. 28B.
Figure 29C:
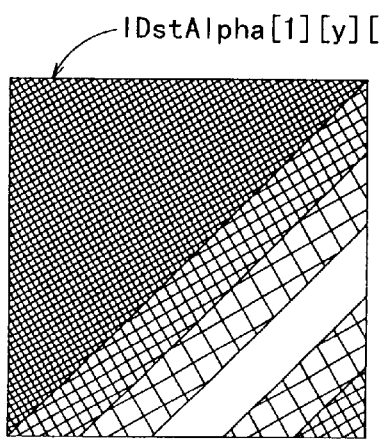
FIG. 29C is a view of an image corresponding to the image shown in FIG. 28C.
Figure 29D:
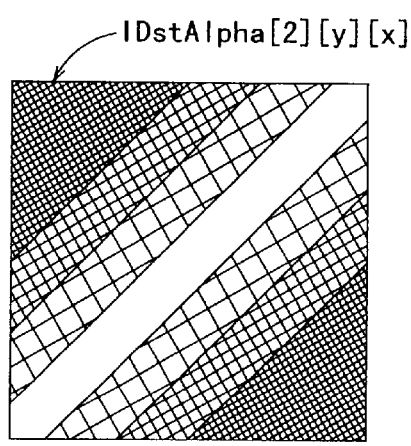
FIG. 29D is a view of an image corresponding to the image shown in FIG. 28D.
Figure 29E:
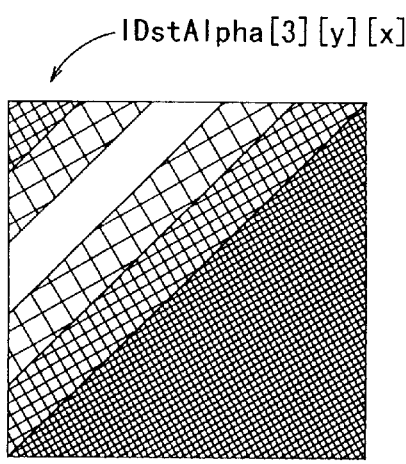
FIG. 29E is a view of an image corresponding to the image shown in FIG. 28E.
Figure 29F:
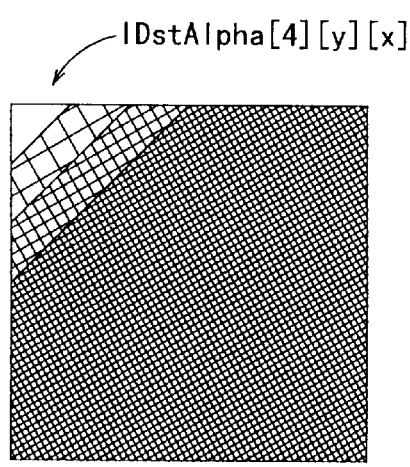
FIG. 29F is a view of an image corresponding to the image shown in FIG. 28F.

The fifth divided gray pattern image DstAlpha[4][y][x] has a peak value Peak=255 and a gradation number range Range=64, and represents the graph shown in FIG. 28F.

The relationship between the gray pattern image picture ISrcAlpha[y][x] to be divided based on the gray pattern image SrcAlpha[y][x] to be divided and the divided gray pattern image picture IDstAlpha[i][y][x] to be divided based on the divided gray pattern image DstAlpha[i][y][x] will be described below with reference to FIGS. 29A through 29F.

In each of FIGS. 29A through 29F, the crosshatched region is a darkest region, the closely hatched region is a next darkest region, the coarsely hatched region is a relatively bright region, and the non-hatched region is a brightest region. Practically, each of these regions represents a gradation whose luminance is gradually lowered from the brightest region toward the darkest region.

The process of dividing the gray pattern image SrcAlpha[y][x] as shown in FIG. 22 is applicable to the gray pattern image Ib as the image data of the gray pattern image picture Qb shown in FIG. 5. If the dividing process is applied to the gray pattern image Ib, then the divided gray pattern image DstAlpha[i][y][x] which is produced contains a considerable range of variations.

If the dividing process based on the simple calculations is employed, then the operator is only required to set the division number NL to values of 2 or more, i.e., NL=2, 3, 4, 5, 6, . . . , and it will automatically be possible to obtain various different gray pattern images DstAlpha[i][y][x] through calculations.

If the division number NL is set to NL=2, then it is possible to obtain the reversed gray pattern image Id which is the reversal of the gray pattern image Ib. In this case, the dividing process serves as the reversing means 102 (see FIG. 2).

FIG. 30 shows an image processing apparatus 200 according to a fourth embodiment of the present invention. The image processing apparatus 200 can be implemented by either software or hardware.

As shown in FIG. 30, the image processing apparatus 200 has an original texture image processing means 214 comprising an enlarging means 110, whose enlargement ratio includes ×1, for generating and outputting various enlarged color images from an original texture image Ia that is a color image, and a positionally displacing means 130 for positionally displacing the original texture image Ia or the enlarged texture image outputted from the enlarging means 110.

The image processing apparatus 200 also has a gray pattern image processing means 216 comprising a dividing means 206 for dividing a gray pattern image SrcAlpha [y][x] into two or more images to generate various gray pattern images DstAlpha[i][y][x], e.g., a means for executing the algorithm shown in FIG. 22, an enlarging means 110A, whose enlargement ratio includes ×1, for enlarging and outputting the gray pattern image SrcAlpha [y][x] or the gray pattern image DstAlpha[i][y][x] outputted from the dividing means 206, and a positionally displacing means 130A for positionally displacing the gray pattern image SrcAlpha [y][x] or the enlarged gray pattern image outputted from the enlarging means 110A.

The image processing apparatus 200 further includes a combining means (texture image generating means) 212 for selectively combining seven input images which include three input images from the original texture image processing means 214 and four input images from the gray pattern image processing means 216, and a mapping means 120 for mapping a texture image Ij onto a shaped surface Op.

The three input images from the original texture image processing means 214 include the original texture image Ia, the enlarged color image from the enlarging means 110, and the positionally displaced image from the positionally displacing means 130. The four input images from the gray pattern image processing means 216 includes the gray pattern image SrcAlpha [y][x], the gray pattern image DstAlpha[i][y][x] from the dividing means 206, the enlarged gray pattern image from the enlarging means 110A, and the positionally displaced gray pattern image from the positionally displacing means 130A.

The enlargement ratios, which include ×1, in the enlarging means 110, 110A, the positional displacements in the positionally displacing means 130, 130A, and the division number NL in the dividing means 206 may be selected according to the attributes Opa of the shaped surface Op or a random number generated by a random number generator (not shown).

With the image processing apparatus 200 shown in FIG. 30, at least one of images produced when the original texture image Ia read from the image memory 74 or the like is processed by the original texture image processing means 214, and at least one of images produced when the gray pattern image SrcAlpha [y][x] having different shades in different positions and read from the image memory 74 or the like is processed by the gray pattern image processing means 216 are selectively combined with each other by the combining means 212 to generate a texture image Ij. Therefore, the image processing apparatus 200 can generate various different texture images Ij.

When the mapping means 120 maps the texture image Ij onto the shaped surface Op, the image processing apparatus 200 produces a mapped image Ik expressing the texture of a mirror or metal surface which has surface irregularities. The image processing apparatus 200 can produce various different mapped images Ik with a relatively simple arrangement.

According to the present invention, as described above, an original texture image and a gray pattern image having differently shaded regions in different positions and/or a reversed gray pattern image that is a reversal of the gray pattern image are combined with each other thereby to generate a texture image. Therefore, the texture image as a special image can easily be generated with a relatively simple arrangement or processing sequence. The texture image thus generated can express a nonsmooth texture.

The texture image may be enlarged according to a value calculated based on the direction of a normal vector, the direction of a line-of-sight vector, and the direction of an imaginary light source vector of a shape surface such as a polygon, a quadratic surface, or the like, and may be combined with the gray pattern image or the reversed gray pattern image to generate a texture image which expresses a realistic nonsmooth texture.

The original texture image, as well as the gray pattern image or the reversed gray pattern image, may be positionally displaced upwardly, downwardly, leftwardly, and rightwardly according to a value calculated based on the direction of a normal vector, the direction of a line-of-sight vector, and the direction of an imaginary light source vector of a shape surface such as a polygon, a quadratic surface, or the like, and may be combined with the gray pattern image or the reversed gray pattern image to generate a texture image which expresses a realistic nonsmooth texture.

The above enlarging process and the above positionally displacing process may be combined with each other to generate a texture image which expresses a more realistic nonsmooth texture.

According to the present invention, a special texture image and various different texture images can easily be generated with a relatively simple arrangement. Consequently, textures can easily be expressed.

Although certain preferred embodiments of the present invention have been shown and described in detail, it should be understood that various changes and modifications may be made therein without departing from the scope of the appended claims.

What is claimed is:

1. A method of generating a processed image, said method comprising:

modifying an original image to obtain a modified image;

combining said modified image with a further image to obtain a first combined image, including, for each portion of said modified image and for each corresponding portion of said further image, multiplying said portion of said modified image by a coefficient corresponding to said portion of said modified image to obtain a first product, multiplying said portion of said further image by a further coefficient corresponding to said portion of said further image to obtain a second product, and adding said first product and said second product to obtain a corresponding portion of said first combined image, said coefficient having a value $\alpha ij$, where $\alpha$ is a ratio for combining images and ij is a pixel address, and said further coefficient having a value $(1-\alpha ij)$;

combining said original image with a still further image to obtain a second combined image; and combining at least said first combined image with said second combined image to obtain said processed image.

2. The method of claim 1, wherein said modifying step includes enlarging said original image.

3. The method of claim 1, wherein said modifying step includes positionally displacing said original image.

4. The method of claim 1, wherein said modifying step includes modifying said original image as a function of an attribute of a shaped surface.

5. The method of claim 4, wherein said attribute is selected from the group consisting of a normal vector of said shaped surface, a line-of-sight vector of said shaped surface, and an imaginary light source vector of said shaped surface.

6. The method of claim 1, wherein said further image is selected from the group consisting of a gray image and a reverse image of said gray image.

7. The method of claim 6, wherein said still further image is another one of the group consisting of said gray image and said reverse image of said gray image.

8. The method of claim 1, wherein said portion of said modified image and said corresponding portion of said further image are pixels.

9. A method of generating a processed image, said method comprising:

modifying an original image to obtain a modified image;

combining said modified image with a further image to obtain a first combined image;

combining said original image with a still further image to obtain a second combined image, including, for each portion of said original image and for each corresponding portion of said still further image, multiplying said portion of said original image by a coefficient corresponding to said portion of said original image to obtain a first product, multiplying said portion of said still further image by a further coefficient corresponding to said portion of said still further image to obtain a second product, and adding said first product and said second product to obtain a corresponding portion of said second combined image, said coefficient having a value $\alpha ij$, where $\alpha$ is a ratio for combining images and ij is a pixel address, and said further coefficient having a value $(1-\alpha ij)$; and combining at least said first combined image with said second combined image to obtain said processed image.

10. The method of claim 9, wherein said portion of said original image and said corresponding portion of said still further image are pixels.

11. The method of claim 9, wherein said modifying step includes enlarging said original image.

12. The method of claim 9, wherein said modifying step includes positionally displacing said original image.

13. The method of claim 9, wherein said modifying step includes modifying said original image as a function of an attribute of a shaped surface.

14. The method of claim 13, wherein said attribute is selected from the group consisting of a normal vector of said shaped surface, a line-of-sight vector of said shaped surface, and an imaginary light source vector of said shaped surface.

15. The method of claim 9, wherein said further image is selected from the group consisting of a gray image and a reverse image of said gray image.

16. The method of claim 15, wherein said still further image is another one of the group consisting of said gray image and said reverse image of said gray image.

17. An apparatus for generating a processed image, said apparatus comprising:

modifying means for modifying an original image to obtain a modified image;

first combining means for combining said modified image with a further image to obtain a first combined image, for each portion of said modified image and for each corresponding portion of said further image, said first combining means multiplies said portion of said modified image by a coefficient corresponding to said portion of said further image to obtain a first product, multiplies said portion of said further image by its corresponding further coefficient to obtain a second product, and adds said first product and said second product to obtain a corresponding portion of said first combined image, said coefficient having a value $\alpha ij$, where $\alpha$ is a ratio for combining images and ij is a pixel address, and said further coefficient having a value $(1-\alpha ij)$;

second combining means for combining said original image with a still further image to obtain a second combined image; and third combining means for combining at least said first combined image with said second combined image to obtain said processed image.

18. The apparatus of claim 17, wherein said modifying means includes enlarging means for enlarging said original image.

19. The apparatus of claim 17, wherein said modifying means includes means for positionally displacing said original image.

20. The apparatus of claim 17, wherein said modifying means modifies said original image as a function of an attribute of a shaped surface.

21. The apparatus of claim 20, wherein said attribute is selected from the group consisting of a normal vector of said shaped surface, a line-of-sight vector of said shaped surface, and an imaginary light source vector of said shaped surface.

22. The apparatus of claim 17, wherein said further image is selected from the group consisting of a gray image and a reverse image of said gray image.

23. The apparatus of claim 22, wherein said still further image is another one of the group consisting of said gray image and said reverse image of said gray image.

24. The apparatus of claim 17, wherein said portion of said modified image and said corresponding portion of said further image are pixels.

25. An apparatus for generating a processed image, said apparatus comprising:

modifying means for modifying an original image to obtain a modified image;

first combining means for combining said modified image with a further image to obtain a first combined image;

second combining means for combining said original image with a still further image to obtain a second combined image, for each portion of said original image and for each corresponding portion of said still further image, said second combining means multiplies said portion of said original image by a coefficient corresponding to said portion of said original image to obtain a first product, multiplies said portion of said still further image by a further coefficient corresponding to said portion of said still further image to obtain a second product, and adds said first product and said second product to obtain a corresponding portion of said second combined image, said coefficient having a value $\alpha ij$, where $\alpha$ is a ratio for combining images and ij is a pixel address, and said further coefficient having a value $(1-\alpha ij)$; and third combining means for combining at least said first combined image with said second combined image to obtain said processed image.

26. The apparatus of claim 25, wherein said portion of said original image and said corresponding portion of said still further image are pixels.

27. The apparatus of claim 25, wherein said modifying means includes enlarging means for enlarging said original image.

28. The apparatus of claim 25, wherein said modifying means includes means for positionally displacing said original image.

29. The apparatus of claim 25, wherein said modifying means modifies said original image as a function of an attribute of a shaped surface.

30. The apparatus of claim 29, wherein said attribute is selected from the group consisting of a normal vector of said shaped surface, a line-of-sight vector of said shaped surface, and an imaginary light source vector of said shaped surface.

31. The apparatus of claim 25, wherein said further image is selected from the group consisting of a gray image and a reverse image of said gray image.

32. The apparatus of claim 31, wherein said still further image is another one of the group consisting of said gray image and said reverse image of said gray image.

33. A readable medium recorded with instructions for transmitting information to a recipient, said instructions comprising:

modifying an original image to obtain a modified image;

combining said modified image with a further image to obtain a first combined image, including, for each portion of said modified image and for each corresponding portion of said further image, multiplying said portion of said modified image by a coefficient corresponding to said portion of said modified image to obtain a first product, multiplying said portion of said further image by a further coefficient corresponding to said portion of said further image to obtain a second product, and adding said first product and said second product to obtain a corresponding portion of said first combined image, said coefficient having a value $\alpha ij$, where $\alpha$ is a ratio for combining images and ij is a pixel address, and said further coefficient having a value $(1-\alpha ij)$;

combining said original image with a still further image to obtain a second combined image; and combining at least said first combined image with said second combined image to obtain a processed image.

34. The readable medium of claim 33, wherein said modifying step includes enlarging said original image.

35. The readable medium of claim 33, wherein said modifying step includes positionally displacing said original image.

36. The readable medium of claim 33, wherein said modifying step includes modifying said original image as a function of an attribute of a shaped surface.

37. The readable medium of claim 36, wherein said attribute is selected from the group consisting of a normal vector of said shaped surface, a line-of-sight vector of said shaped surface, and an imaginary light source vector of said shaped surface.

38. The readable medium of claim 33, wherein said further image is selected from the group consisting of a gray image and a reverse image of said gray image.

39. The readable medium of claim 38, wherein said still further image is another one of the group consisting of said gray image and said reverse image of said gray image.

40. The readable medium of claim 33, wherein said portion of said modified image and said corresponding portion of said further image are pixels.

41. A readable medium recorded with instructions for transmitting information to a recipient, said instructions comprising:

modifying an original image to obtain a modified image;

combining said modified image with a further image to obtain a first combined image;

combining said original image with a still further image to obtain a second combined image, including, for each portion of said original image and for each corresponding portion of said still further image, multiplying said portion of said original image by a coefficient corresponding to said portion of said original image to obtain a first product, multiplying said portion of said still further image by a further coefficient corresponding to said portion of said still further image to obtain a second product, and adding said first product and said second product to obtain a corresponding portion of said second combined image, said coefficient having a value $\alpha ij$, where $\alpha$ is a ratio for combining images and ij is a pixel address, and said further coefficient having a value $(1-\alpha ij)$; and combining at least said first combined image with said second combined image to obtain a processed image.

42. The readable medium of claim 41, wherein said portion of said original image and said corresponding portion of said still further image are pixels.

43. The readable medium of claim 41, wherein said modifying step includes enlarging said original image.

44. The readable medium of claim 41, wherein said modifying step includes positionally displacing said original image.

45. The readable medium of claim 41, wherein said modifying step includes modifying said original image as a function of an attribute of a shaped surface.

46. The readable medium of claim 45, wherein said attribute is selected from the group consisting of a normal vector of said shaped surface, a line-of-sight vector of said shaped surface, and an imaginary light source vector of said shaped surface.

47. The readable medium of claim 41, wherein said further image is selected from the group consisting of a gray image and a reverse image of said gray image.

48. The readable medium of claim 47, wherein said still further image is another one of the group consisting of said gray image and said reverse image of said gray image.

* * * * *

UNITED STATES PATENT AND TRADEMARK OFFICE
CERTIFICATE OF CORRECTION

PATENT NO.    : 6,744,440 B1
DATED         : June 1, 2004
INVENTOR(S)   : Tadashi Nakamura It is certified that error appears in the above-identified patent and that said Letters Patent is hereby corrected as shown below:

Title page,
Item [57], please delete the ABSTRACT and substitute the following therefor:
-- The texture of a nonsmooth mirror or metal surface can be generated by a simple, highly effective bump mapping process. An original image, such as a color image, is combined with a further image having differently shaped regions in different positions by a first combining unit to generate a first combined image. The original image is modified based on attributes of a polygon, which include the direction of a normal vector, etc., to generate a modified original image. The modified original image and a still further image are combined image and the second combined image are combined to generate a third combined image. The third combined image is capable of expressing the texture of a nonsmooth mirror or metal surface. --

Column 8,
Lines 27 and 56, "pixelsxseveral" should read -- pixels x several --.

Column 9,
Line 10, "pixelsxseveral" should read -- pixels x several --.

Column 14,
Line 45, "pixelsxseveral" should read -- pixels x several --.

Column 15,
Line 53, "pixelsxV" should read -- pixels x V --.
Line 53, "pixelsx256" should read -- pixels x 256 --.

Signed and Sealed this

Twenty-first Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,744,440 B1
DATED : June 1, 2004
INVENTOR(S) : Tadashi Nakamura

It is certified that error appears in the above-identified patent and that said Letters Patent is hereby corrected as shown below:

Title page,
Item [57], please delete the ABSTRACT and substitute the following therefor:
-- The texture of a nonsmooth mirror or metal surface can be generated by a simple, highly effective bump mapping process. An original image, such as a color image, is combined with a further image having differently shaped regions in different positions by a first combining unit to generate a first combined image. The original image is modified based on attributes of a polygon, which include the direction of a normal vector, etc., to generate a modified original image. The modified original image and a still further image are combined by a second combined unit to generate second combined image. The first combined image or the second combined image are combined to generate a third combined image. The third combined image is capable of expressing the texture of a nonsmooth mirror or metal surface. --

Column 8,
Lines 27 and 56, "pixelsxseveral" should read -- pixels x several --.

Column 9,
Line 10, "pixelsxseveral" should read -- pixels x several --.

Column 14,
Line 45, "pixelsxseveral" should read -- pixels x several --.

Column 15,
Line 53, "pixelsxV" should read -- pixels x V --.
Line 53, "pixelsx256" should read -- pixels x 256 --.

This certificate supersedes Certificate of Correction issued September 21, 2004.

Signed and Sealed this

Twenty-fourth Day of May, 2005

JON W. DUDAS
*Director of the United States Patent and Trademark Office*

UNITED STATES PATENT AND TRADEMARK OFFICE
CERTIFICATE OF CORRECTION

PATENT NO.        : 6,744,440 B1
APPLICATION NO. : 09/657092
DATED               : June 1, 2004
INVENTOR(S)      : Tadashi Nakamura It is certified that error appears in the above-identified patent and that said Letters Patent is hereby corrected as shown below:

Title page,
Item [57], please delete the ABSTRACT and substitute the following therefor:
-- The texture of a nonsmooth mirror or metal surface can be generated by a simple, highly effective bump mapping process. An original image, such as a color image, is combined with a further image having differently shaped regions in different positions by a first combining unit to generate a first combined image. The original image is modified based on attributes of a polygon, which include the direction of a normal vector, etc., to generate a modified original image. The modified original image and a still further image are combined by a second combining unit to generate a second combined image. The first combined image and the second combined image are combined to generate a third combined image. The third combined image is capable of expressing the texture of a nonsmooth mirror or metal surface. --

Column 8,
Lines 27 and 56, "pixelsxseveral" should read -- pixels x several --.

Column 9,
Line 10, "pixelsxseveral" should read -- pixels x several --.

Column 14,
Line 45, "pixelsxseveral" should read -- pixels x several --.

UNITED STATES PATENT AND TRADEMARK OFFICE
CERTIFICATE OF CORRECTION

PATENT NO. : 6,744,440 B1
APPLICATION NO. : 09/657092
DATED : June 1, 2004
INVENTOR(S) : Tadashi Nakamura It is certified that error appears in the above-identified patent and that said Letters Patent is hereby corrected as shown below:

Column 15,
Line 53, "pixelsxV" should read -- pixels x V --.
Line 53, "pixelsx256" should read -- pixels x 256 --.

This certificate supersedes Certificate of Correction issued September 21, 2004 and May 24, 2005.

Signed and Sealed this

Tenth Day of October, 2006

JON W. DUDAS
*Director of the United States Patent and Trademark Office*